US008321850B2

(12) United States Patent
Bruening et al.

(10) Patent No.: US 8,321,850 B2
(45) Date of Patent: Nov. 27, 2012

(54) SHARING AND PERSISTING CODE CACHES

(75) Inventors: Derek Bruening, Troy, NY (US); Vladimir L. Kiriansky, Alameda, CA (US)

(73) Assignee: VMware, Inc., Palo, CA (US)

( * ) Notice: Subject to any disclaimer, the term of this patent is extended or adjusted under 35 U.S.C. 154(b) by 1174 days.

(21) Appl. No.: 12/135,020

(22) Filed: Jun. 6, 2008

(65) Prior Publication Data

US 2009/0307430 A1 Dec. 10, 2009

(51) Int. Cl.
*G06F 9/45* (2006.01)
(52) U.S. Cl. .................................................. 717/151
(58) Field of Classification Search .................. None
See application file for complete search history.

(56) References Cited

U.S. PATENT DOCUMENTS

| | | | | |
|---|---|---|---|---|
| 5,768,593 | A * | 6/1998 | Walters et al. | 717/141 |
| 6,415,303 | B1 * | 7/2002 | Meier et al. | 715/202 |
| 7,984,304 | B1 * | 7/2011 | Waldspurger et al. | 713/187 |
| 2004/0054994 | A1 * | 3/2004 | Demsey et al. | 717/148 |
| 2004/0117437 | A1 * | 6/2004 | Frank | 709/203 |
| 2004/0133884 | A1 * | 7/2004 | Zemach et al. | 717/138 |
| 2004/0199897 | A1 * | 10/2004 | Ghercioiu et al. | 717/101 |
| 2005/0022167 | A1 * | 1/2005 | Gryko et al. | 717/124 |
| 2006/0130016 | A1 * | 6/2006 | Wagner | 717/136 |
| 2007/0174817 | A1 * | 7/2007 | Fanning et al. | 717/124 |
| 2007/0192761 | A1 * | 8/2007 | Sahita et al. | 717/140 |
| 2008/0028179 | A1 * | 1/2008 | Mannarswamy et al. | 711/173 |
| 2008/0126706 | A1 * | 5/2008 | Newport et al. | 711/118 |
| 2008/0162821 | A1 * | 7/2008 | Duran et al. | 711/133 |
| 2009/0183009 | A1 * | 7/2009 | Delfs et al. | 713/193 |
| 2009/0271172 | A1 * | 10/2009 | Mejdrich et al. | 703/26 |
| 2009/0282139 | A1 * | 11/2009 | Mejdrich et al. | 709/223 |
| 2009/0307430 | A1 * | 12/2009 | Bruening et al. | 711/119 |

OTHER PUBLICATIONS

Ali-Reza Adl-Tabatabai, et al., "Fast, Effective Code Generation in a Just-In-Time Java Compiler", In ACM SIGPLAN Conference on Programming Language Design and Implementation (PLDI '98). 1998. pp. 280-290.
Matthew Arnold, et al., "Adaptive Optimization in the Jalapeno JVM", In ACM SIGPLAN Conference on Object-Oriented Programming Systems, Languages, and Applications (OOPSLA '00). 2000, 47-65.
Vasanth Bala, et al., "Dynamo: A Transparent Dynamic Optimization System", In ACM SIGPLAN Conference on Programming Language Design and Implementation (PLDI '00), 2000, 1-12.
Derek Bruening, et al., "Maintaining Consistencey and Bounding Capacity of Software Code Caches", In International Symposium on Code Generation and Optimization (CGO '05), 2005. 74-85.
Derek Bruening, "Efficient, Transparent, and Comprehensive Runtime Code Manipulation", PhD Thesis, M.I.T., 2004, 306 pages.
Edouard Bugnion, et al., "Disco: Running Commodity Operating Systems on Scalable Multiprocessors", In 16th ACM Symposium on Operating System Principles (SOSP '97), 1997, pp. 143-156.

(Continued)

*Primary Examiner* — Wei Zhen
*Assistant Examiner* — Adam R Banes

(57) ABSTRACT

Computer code from an application program comprising a plurality of modules that each comprise a separately loadable file is code cached in a shared and persistent caching system. A shared code caching engine receives native code comprising at least a portion of a single module of the application program, and stores runtime data corresponding to the native code in a cache data file in the non-volatile memory. The engine then converts cache data file into a code cache file and enables the code cache file to be pre-loaded as a runtime code cache. These steps are repeated to store a plurality of separate code cache files at different locations in non-volatile memory.

71 Claims, 12 Drawing Sheets

OTHER PUBLICATIONS

Prashanth P. Bungale, et al., "PinOS: A Programmable Framework for Whole-System Dynamic Instrumentation", In 3rd International Conference on Virtual Execution Environments (VEE '07), 2007, pp. 137-147.

Wen-Ke Chen, et al., "Mojo: A Dynamic Optimization System", In 3rd ACM Workshop on Feedback-Directed and Dynamic Optimization (FDDO-3), 2000, pp. 81-90.

Anton Chernoff, et al., "FXI32: A Profile-Directed Binary Translator", IEEE Micro, 18(2) Mar. 1998. pp. 56-64.

Christina Cifuentes, et al., "Walkabout—A Retargetable Dynamic Binary Translation Framework", In 4th Workshop on Binary Translation, 2002, 13 pages.

Bob Cmelik, et al., "Shade: A Fast Instruction-Set Simulator for Execution Profiling", ACM SIGMETRICS Performance Evaluation Review, 22(1) May 1994, pp. 128-137.

Connectix, "Virtual PC", http://www.microsoft.com/windows/virtualpc/default.mspx.

Grzegorz Czajkowski, "Code Sharing among Virtual Machines", In 16th European Conference on Object-Oriented Programming (ECOOP 2002), 2002, pp. 155-177.

James C. Dehnert, et al., "The Transmeta Code Morphing (TM) Software: Using Speculation, Recovery, and Adaptive Retranslation to Address Real-Life Challenges", In International Symposium on Code Generation and Optimization (CGO '03), 2003, pp. 15-24.

Giuseppe Desoli, et al., "DELI: A New Run-Time Control Point", In 35th Internation Symposium on Microarchitecture (MICRO '02), 2002, pp. 257-268.

L. Peter Deutsch, "Efficient Implementation of the Smalltalk-80 System", In ACM SIGPLAN-SIGACT Symposium on Principles of Programming Languages (POPL '84), 1984, pp. 297-302.

Kernel Ebcioglu, et al., "DAISY: Dynamic Compilation for 100% Architectural Compatibility", In 24th International Symposium on Computer Architecture (ISCA '97), 1997, pp. 26-37.

Kim Hazelwood, et al., "Characterizing Inter-Execution and Inter-Application Optimization Persistence", In Workshop on Exploring the Trace Space for Dynamic Optimization Techniques, 2003, pp. 51-58.

Urs Holzle. "Adaptive Optimization for Self: Reconciling High Performance with Exploratory Programming", PhD Thesis, Stanford University, Palo Alto, CA, Aug. 1994, 181 pages.

Andrew Kennedy, et al., "Combining Generics, Pre-compilation and Sharing Between Software-Based Processes", In Second workshop on Semantics, Program Analysis and Computing Environments for Memory Management (SPACE '04), 2002, pp. 257-268.

Alexander Klaiber, "The Technology Behind Crusoe Processors", Transmeta Corporation, Jan. 2000, 18 pages. http://www.transmeta.com/crusoe/download/pdf/crusoetechwp.pdf.

James R. Larus, et al., "EEL: Machine-Independent Executable Editing", In ACM SIGPLAN Conference on Programming Language Design and Implementation (PLDI '95),1995, pp. 291-300.

Jianhui Li, et al., "Module-aware Translation for Real-life Desktop Applications", In 1st ACM/USENIX International Conference on Virtual Execution Enviornments (VEE '05), ACM Press, New York, NY, USA, 2005, pp. 89-99.

Chi-Keung Luk, et al., "Pin: Building Customized Program Analysis Tools with Dynamic Instrumentation", In ACM SIGPLAN Conference on Programming Language Design and Implementation (PLDI '05), 2005, pp. 190-200.

Peter S. Magnusson, et al., "SimICS/sun4m: A Virtual Workstation", In USENIX Annual Technical Conference, 1998, pp. 119-130.

Nicholas Nethercote, et al., "Valgrind: A Program Supervision Framework", In 3rd Workshop on Runtime Verification (RV '03), 2003, 23 pages.

Vijay Janapa Reddi, et al., "Persistence in Dynamic Code Transformation Systems", SIGARCH Computer Architecture News, 33(5) Dec. 2005, pp. 69-74.

Vijay Janapa Reddi, et al., "Persistence Code Caching: Exploiting Code Reuse Across Executions and Applications", In International Symposium on Code Generation and Optimization (CGO '07), 2007, pp. 74-88.

Alan Robinson, "Why Dynamic Translation", Transitive Technologies Ltd., May 2001, 9 pages. http://www.transitive.com/documents/Why_Dynamic_Translation1.pdf.

Ted Romer, et al., "Instrumentation and Optimization of Win32/Intel Executables Using Etch", Proceedings of the USENIX Windows NT Workshop 1997, 8 pages, Aug. 1997, Seattle, Washington.

K. Scott, et al., "Retargetable and Reconfigurable Software Dynamic Translation", Proceedings of the International Symposium on Code Generation and Optimization: Feedback-Directed and Runtime Optimization, Mar. 2003, San Francisco, California, pp. 36-47.

Swaroop Sridhar, et al. , "HDTrans: An Open Source, Low-Level Dynamic Instrumentation System", In 2nd International Conference on Virtual Execution Environments (VEE '06), ACM Press, New York, NY, USA, Jun. 2006, pp. 175-185.

Amitabh Srivastava, et al., "ATOM: A System for Building Customized Program Analysis Tools", In ACM SIGPLAN Conference on Programming Language Design and Implementation (PLDI '94), pp. 196-205, Jun. 1994, Orlando, Florida, USA.

Amitabh Srivastava, et al., "Vulcan: Binary transformation in a distributed environment", Tech. Rep. MSR-TR-2001-50, Microsoft Research, Apr. 2001, 34 pages.

Sun Microsystems. "The Java HotSpot Performance Engine Architecture.", 12 pages, http://java.sun.com/products/hotspot/whitepaper.html.

James Waskiewicz, "Dyninst object serialization/deserialization", May 2007, 21 pages, http://www.paradyn.org/PCW2007/paradyn\verb+_+\\presentations/pdfs/law.pdf.

Andrew Whitaker, et al., "Denali: Lightweight Virtual Machines for Distributed and Networked Applications", In USENIX Annual Technical Conference, 2002, pp. 195-209.

Emmett Witchel, et al., "Embra: Fast and Flexible Machine Simulation", In 1996 ACM SIGMETRICS Conference on Measurement and Modeling of Computer Systems, May 1996, pp. 68-79, Philadelphia, Pennsylvania, USA.

Xiaolan Zhang , et al., "System Support for Automatic Profiling and Optimization", In 16th ACM Symposium on Operating System Principles (SOSP '97), 1997, pp. 15-26, Saint Maio, France.

Cindy Zhen, et al., "PA-RISC to IA-64: Transparent Execution, No Recompilation", IEEE Computer, 33(3), Mar. 2000, pp. 47-53.

Jerry Honeycutt, Microsoft, "Microsoft Virtual PC 2007 Technical Overview", Feb. 2007, 27 pages.

Derek Bruening, "Process-Shared and Persistent Code Caches", VEE '08, Mar. 5-7, 2008, Seattle, Washington, 2008, 10 pages.

Derek Bruening, "Thread-Shared Software Code Caches", Proceedings of the International Symposium on Code Generation and Optimization (CGO'06), 2006, 11 pages.

* cited by examiner

SHARING AND PERSISTING CODE CACHES

FEDERALLY SPONSORED RESEARCH

This invention was made with government support under Cooperative Agreement No. FA 8750-06-2-0189 awarded by the Air Force Research Laboratory. The U.S. Government has certain rights in the invention.

BACKGROUND

Embodiments of the present invention relate to the utilization of software code caches in computer systems.

Software code caches are used to store frequently executed sequences of translated or instrumented code for use in subsequent executions to avoid repeated re-translation of the frequently used code. The code cache is stored in a reserved section of a rapidly accessible memory of the computer system to allow faster retrieval of this information. For example, code caches can be used to store data or instructions that a program accesses each time during startup or frequently during operation of the program. As another example, dynamic compilers store compiled intermediate language native code in a code cache to improve the rate at which native machine code is generated on a computer system.

Software code caches are found in a variety of computing systems; for example, dynamic translators, dynamic optimizers, dynamic languages, emulators, simulators, instrumentation engines and other tools. Dynamic translators use code caches to reduce translation overhead, while dynamic optimizers perform native-to-native translation and optimization using runtime information not available to a static compiler. Similarly, just-in-time (JIT) compilers translate from high-level languages to machine code and cache the results for future execution. Instruction set emulators and whole-system simulators use caching to amortize emulation overhead. Software code caches are also coupled with computer hardware support for hardware virtualization and instruction set compatibility. Further, to avoid transparency and granularity limitations of inserting trampolines directly into application program code, recent runtime tool platforms are being built with software code caches.

However, software code caches, and data structures used to manage them, consume significant amounts of additional memory, which limits the scalability of dynamic tool development. Further, code caching tools were initially applied to only one process at a time, and the resulting memory consumption was deemed acceptable. However, newer computer systems apply code caching simultaneously to many processes, including production systems. For example, code caching is being applied to security, optimization, auditing, profiling, and many other application areas. However, when code caching is applied simultaneously to many processes, the combined additional consumption of memory ultimately degrades computing performance. The scalability of dynamic tool development is limited when many processes cannot simultaneously access a code cache without consuming excessive amounts of memory.

Inter-process sharing of code caches allows efficient application of code caching tools to many processes simultaneously without using large amounts of memory by allowing simultaneously running processes to access and share a code cache. On conventional operating systems, shared libraries of code have been used to allow multiple application programs to execute similar code; however, code caches reverse the benefits of shared libraries by making the shared code private again. Inter-process code cache sharing solves the memory consumption problem but introduces other problems that are not present with shared libraries. These problems arise because code caches vary dynamically across application programs and executions, while shared libraries contain statically generated and constant code segments. For example, in inter-process sharing of code caches, it is difficult to synchronize code caches with their original source application program code and maintain them with patches or software fixes, while still securing the program code of a code cache from malicious or inadvertent modification. Code caches should be kept synchronized with their source application program code, because the application program can change over time, as for example when the original source code is updated. Also, to allow inter-process sharing of code caches, the code caches exported by separate processes should be merged together prior to storage or execution. In addition, different processes may have modules loaded at different addresses, different versions of modules, or varying dynamic modification to modules. Yet other problems arise because instrumentation added to the code cache can vary by tools or process.

Persist code caches improve process efficiency and scalability. Studies have shown the potential benefit from re-using code caches across executions, which has been confirmed by at least one persistent cache implementation. Persistence across library re-loads but within a single execution has also been shown to improve code cache performance. Even systems not utilizing full code caches can benefit from serialization of instrumentation code.

However, relatively little work has been done to explore inter-process sharing of persistent code caches. For example, DEC's system for IA-32 Windows migration to Alpha combines an emulator with offline binary translation, and translated code is stored in native libraries and organized by module (Digital Equipment Corp, Boston, Mass.). However, security is not a high priority in this system, and low-privilege application programs may be allowed to produce translated code which can be used by a high-privilege application program. As another example, Transitive® employs process-shared code caches but these caches are not made persistent due to security concerns (Transitive Corp., Los Gatos, Calif.). Systems that operate below the operating system also have an option of sharing code caches at the physical page level. However, it may be more practical to use virtual address tagging, as sharing across different address spaces (instead of isolating by flushing or using ASIDs—address space identifiers) brings its own complications and costs, especially for software systems on current hardware. Language virtual machines also typically do not persist their JIT-compiled object code. For example, sharing of bytecode and other read-only information, as well as sharing of JIT-compiled code, across Java virtual machines running in separate processes have been evaluated in the absence of persistence.

The .NET pre-compiler NGen produces native code that is persisted and shared across processes. As .NET code units often have numerous dependencies, .NET 2.0 introduces a background service that tracks static dependencies and re-compiles NGen images when their dependencies change. NGen will only share code that has been cryptographically signed. If the NGen image for the code was installed into a secure directory, at load time no verification is performed; if the image is stored elsewhere, the .NET loader verifies the signature, which involves examining most of the pages in the image and usually eliminates any performance gains from persistence. A potential privilege escalation vector exists, then, if there is a bug in the installation tool that verifies signatures prior to inserting into the secure directory.

Static instrumentation tools such as ATOM and Morph for Alpha AXP, Vulcan and Etch for IA-32, and EEL for SPARC all produce persistent versions of instrumented binaries. Their disadvantages include difficulty statically discovering code as well as code expansion due to applying instrumentation to all code rather than only executed code, though Etch does attempt to address these issues by using a profiling run. HDTrans evaluated static pre-translation to prime runtime code caches, but found the cost of relocation to be prohibitive.

SUMMARY

In one aspect, a method of caching computer code from an application program is performed on a computer system comprising non-volatile memory and volatile memory. The application program comprises a plurality of modules that each comprises a separately loadable file. In the method, native code comprising at least a portion of a single module of the application program, is received. Runtime data corresponding to the native code is stored in a cache data file in the non-volatile memory. The cache data file is converted into a code cache file, and the code cache file is enabled to be pre-loaded as a runtime code cache. These steps are repeated to store a plurality of separate code cache files at different locations in the non-volatile memory.

An apparatus for code caching comprises a processor, non-volatile memory, volatile memory, and a shared code caching engine comprising code instruction sets for (1) receiving native code comprising at least a portion of a module of the application program; (2) storing runtime data corresponding to the native code in a cache data file in the non-volatile memory; (3) converting the cache data file into a code cache file; (4) enabling the code cache file to be pre-loaded as a runtime code cache; and (5) repeating (1) through (4), to store a plurality of separate cache data files at different locations in non-volatile memory.

Another apparatus for code caching comprises a processor, a non-volatile memory coupled to the volatile memory via a first bus, a processor coupled to the non-volatile memory via a second bus, an address bus connecting the processor and the non-volatile memory for delivering code request signals from the processor to the non-volatile memory. Means responsive to the code request signals transfer requested code from the non-volatile memory to the processor if the requested code is stored in cache code files in the non-volatile memory. Means responsive to the code request signal transfer the requested code from the volatile memory to the processor via the non-volatile memory if the requested code is not stored in cache code files in non-volatile memory. A shared code caching engine is coupled to receive executed native code output from the volatile memory via the first bus, the executed native code comprising at least a portion of a module of the application program. The shared code caching engine comprising code instruction sets for (i) storing data corresponding to the native code in a plurality of cache data files at different locations in the non-volatile memory, and (ii) using the plurality of separate cache data files to enable pre-loading of a runtime code cache in the volatile memory.

In a further aspect, a code caching method comprises receiving a plurality of blocks of native code is received from the application program, and selecting for each block of native code, a code caching scheme for storing runtime data corresponding to the block of native code, from at least two different code caching schemes that each comprise a different demarcation of the runtime data into separable divisions of runtime data that can each be individually removed, replaced, or have their entrances or exits modified. An apparatus for code caching comprises a shared code caching engine comprising code instruction sets for performing these steps.

In yet another aspect, a code caching method comprises receiving one or more blocks of executed native code from a module of the application program and selecting a code caching scheme for storing runtime data corresponding to the blocks of executed native code in a cache data file, from (i) a fine-grain scheme that uses a plurality of data structures to allow manipulation of the received blocks of executed native code; and (ii) a coarse-grain scheme that uses a single data structure to identify a code cache entry point corresponding to the original address of the received blocks of executed native code. An apparatus for such code caching is also claimed.

In another code caching method, native code comprising at least a portion of a single module of the application program, is received. Runtime data corresponding to the native code is stored in a cache data file in the non-volatile memory. The cache data file is converted into a code cache file that includes at least one read-only section that can be switched to a writable section when a link to a target outside the code cache file is called at runtime and switched back to a read-only section after performing the link. The code cache file is enabled to be pre-loaded as a runtime code cache. These steps are repeated to store a plurality of separate code cache files at different locations in non-volatile memory.

An apparatus for code caching comprises a shared code caching engine comprising code instruction sets for performing these steps. a shared code caching engine comprising code instruction sets for: (i) receiving native code comprising at least a portion of a module of the application program; (ii) storing runtime data corresponding to the native code; (iii) converting the cache data file into a code cache file, the code cache file including at least one read-only section that can be switched to a writable section when a link to another code cache file is called at runtime; (iv) enabling the code cache file to be pre-loaded as a runtime code cache; and (v) repeating (i) through (iv), to store a plurality of separate code cache files at different locations in non-volatile memory.

In still another method, a block of native code from a module of the application program, is received. A code cache entry point corresponding to the original address of the received block of native code is identified. Runtime data corresponding to the received block of native code in a cache data file identified by the code cache entry point, is stored in a protected directory of the non-volatile memory. An apparatus for code caching comprises a shared code caching engine comprising code instruction sets for performing these steps.

DRAWINGS

Figure 10:
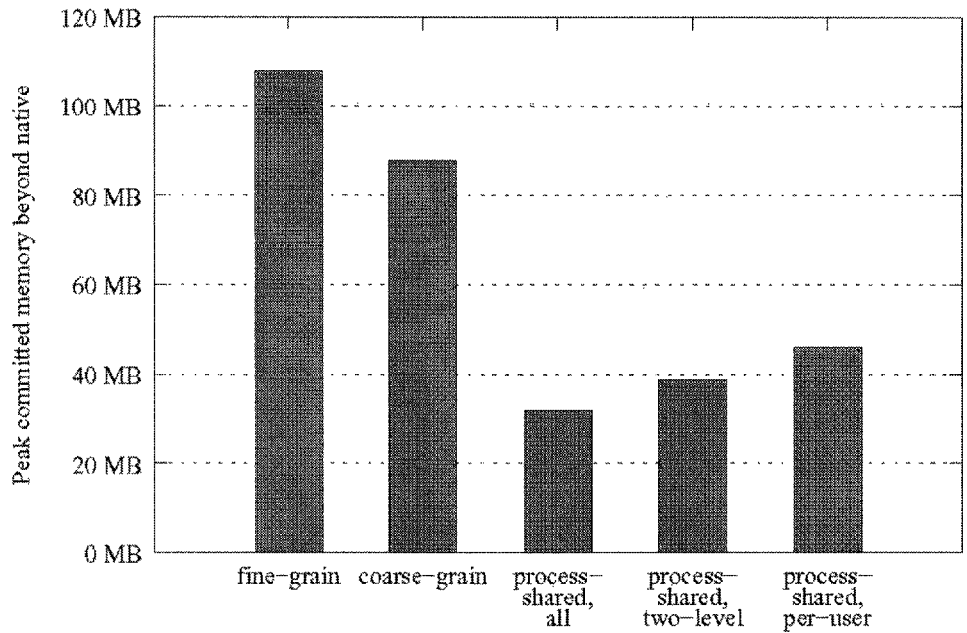
Figure 11:
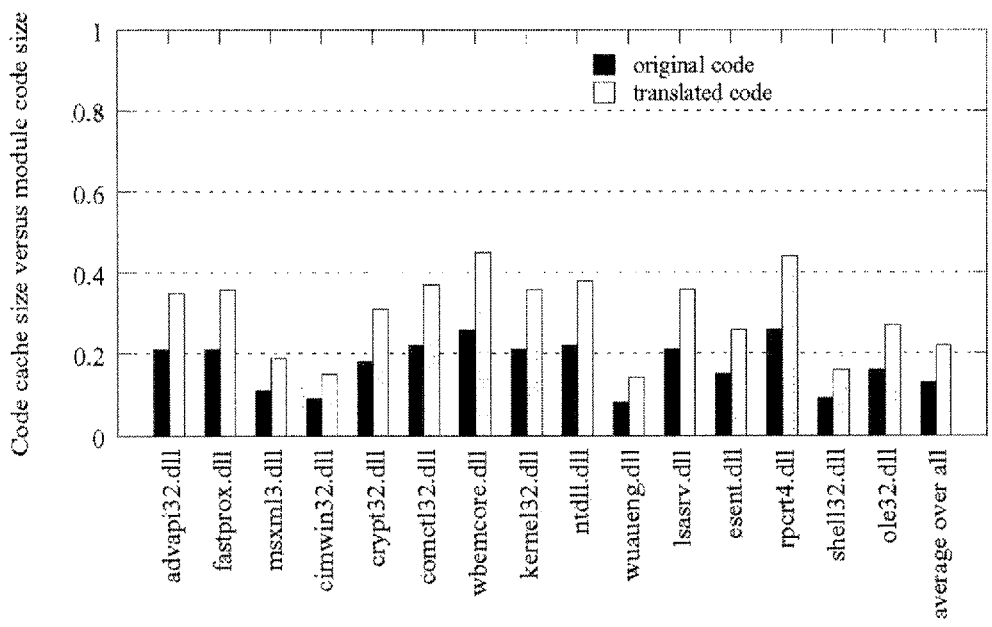
Figure 12:
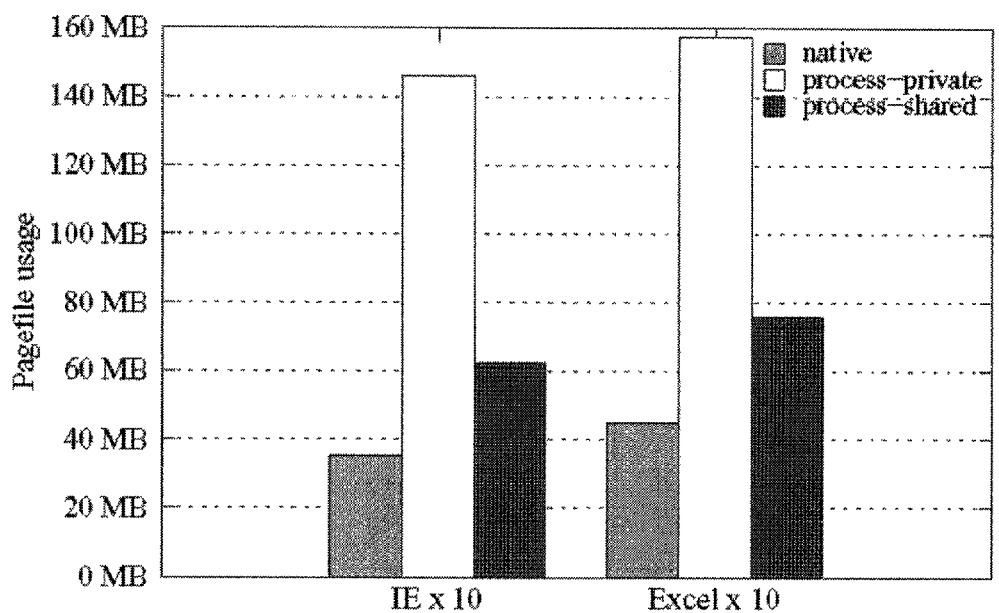
Figure 13:
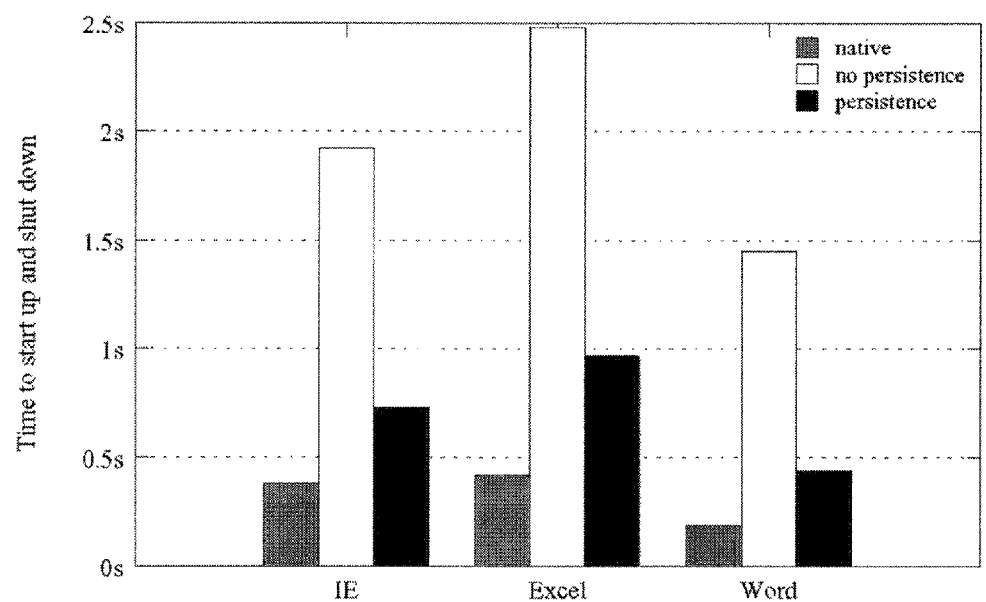
Figure 14:
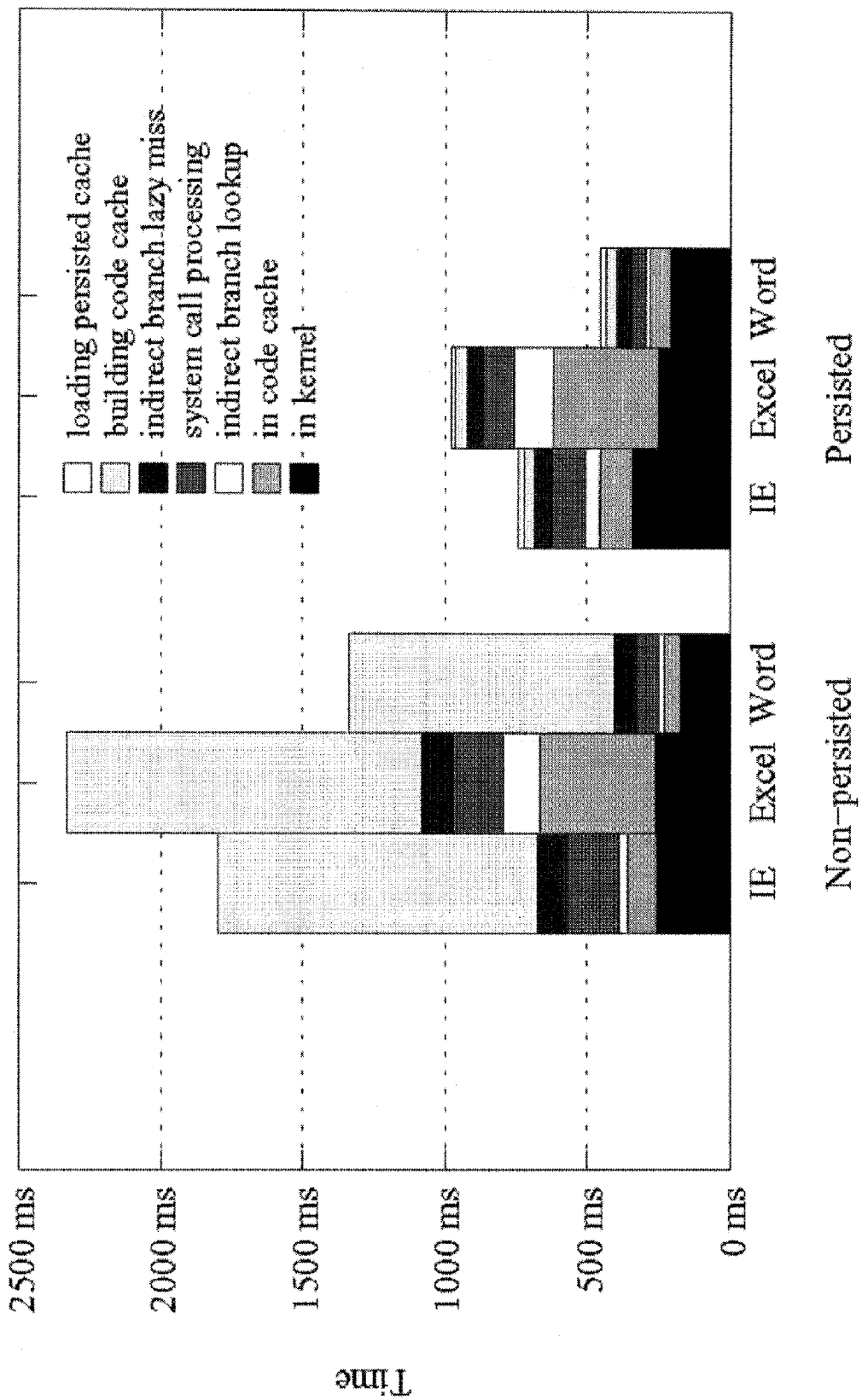

FIG. 10 is a bar graph showing the peak committed memory beyond native usage during boot and logon for five different code caching schemes: fine-grain, coarse-grain without process-shared code caches, coarse-grain caches shared among all processes, coarse-grain caches shared in a two-level scheme as used by the present SCCE, and coarse-grain caches shared only among each user but not between users;

FIG. 11 is a bar graph showing code cache sizes relative to native module sizes for the fifteen largest code caches from the caches shared among all users (the configuration with the largest caches) in the boot benchmark, along with the average over all 206 modules;

FIG. 12 is a bar graph showing the pagefile usage of ten instances of Internet Explorer 6.0 and Excel 2000 processes executing simultaneously: natively, without process-shared code caches, and with process-shared code caches;

FIG. 13 is a bar graph showing the comparative startup performance achieved by the present code cache design with and without persistent code caches, for each of three typical large desktop application programs: Microsoft Internet Explorer®, Microsoft Excel®, and Microsoft Word 2000®; and FIG. 14 is a bar graph showing the breakdown of the processing time spent to start up and shut down Internet Explorer 6.0, Excel 2000, and Word 2000, for non-persisted and persisted caches showing that persisting code caches removes nearly all the code cache creation time.

DESCRIPTION

A computer system 20 running a shared code caching engine according to an embodiment of the present invention allows inter-process code sharing of code caches. The code caches can be shared amongst two or more different processes running different application programs or the same program. The code caches can also be shared by different processes running on different computer systems by allowing a remote computer to load the code cache over the network of computers. Furthermore, the code caches can be made to be persistent while minimizing security risks. Cache coherency and runtime code checking is performed on the persistent code caches with reduced process overheads.

Figure 1:
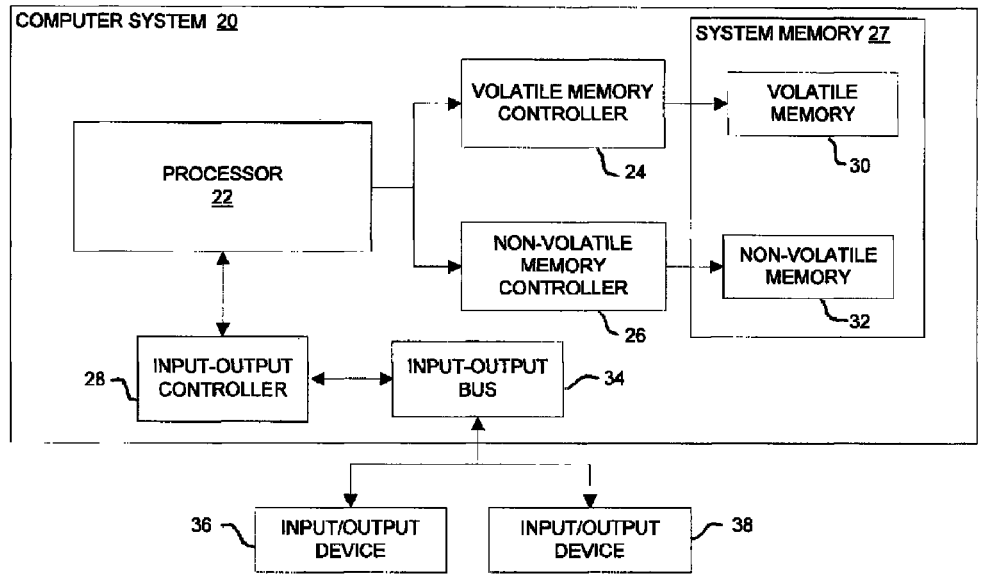
FIG. 1 is a schematic diagram of an exemplary embodiment of a computer system for implementing the code caching system on a processor.

An exemplary embodiment of a computer system 20 for implementing the code caching system on a processor 22, such as a CPU, coupled to various chipsets which provide input-output and memory management, general purpose and special-purpose register, clocking, and other such functions, is illustrated in FIG. 1. For example, the chipsets can include memory management chipsets such as a volatile memory controller 24 and a non-volatile memory controller 26 that operate on a systems memory 27, and input-output chipsets such as an input-output controller 28. For example, the processor 22 and system memory 27 are used to implement a compiler and shared code caching engine. The volatile memory controller 24 performs functions that enable the processor 22 to access a volatile memory 30 of the system memory 27, while the non-volatile memory controller 26 enables the processor 22 to access a non-volatile memory 32. The volatile memory 30 can include, for example, static random access memory (SRAM) or dynamic random access memory (DRAM). The non-volatile memory 32 is computer memory or storage that can retain the stored information even when not externally powered. Examples of non-volatile memory 32 include read-only memory, flash memory, most types of magnetic computer storage devices, such as for example, hard disks, floppy disk drives, magnetic tape, optical disc drives, and other computer storage systems. The input-output controller 28 enables the processor 22 to communicate via an input-output bus 34 with one or more peripheral input-output devices 36, 38 to accept data input from, or output data to, these devices. The input-output devices 36, 38 can include, for example, a keyboard, mouse, or display. Any one of the chipsets or devices can be integrated with one another, for example, the memory controllers 24, 26 can be integrated with the input-output controller 28, and either or both can be integrated into the processor 22. The computer system 20 is associated with, or operated by, one or more end-users.

Figure 2:
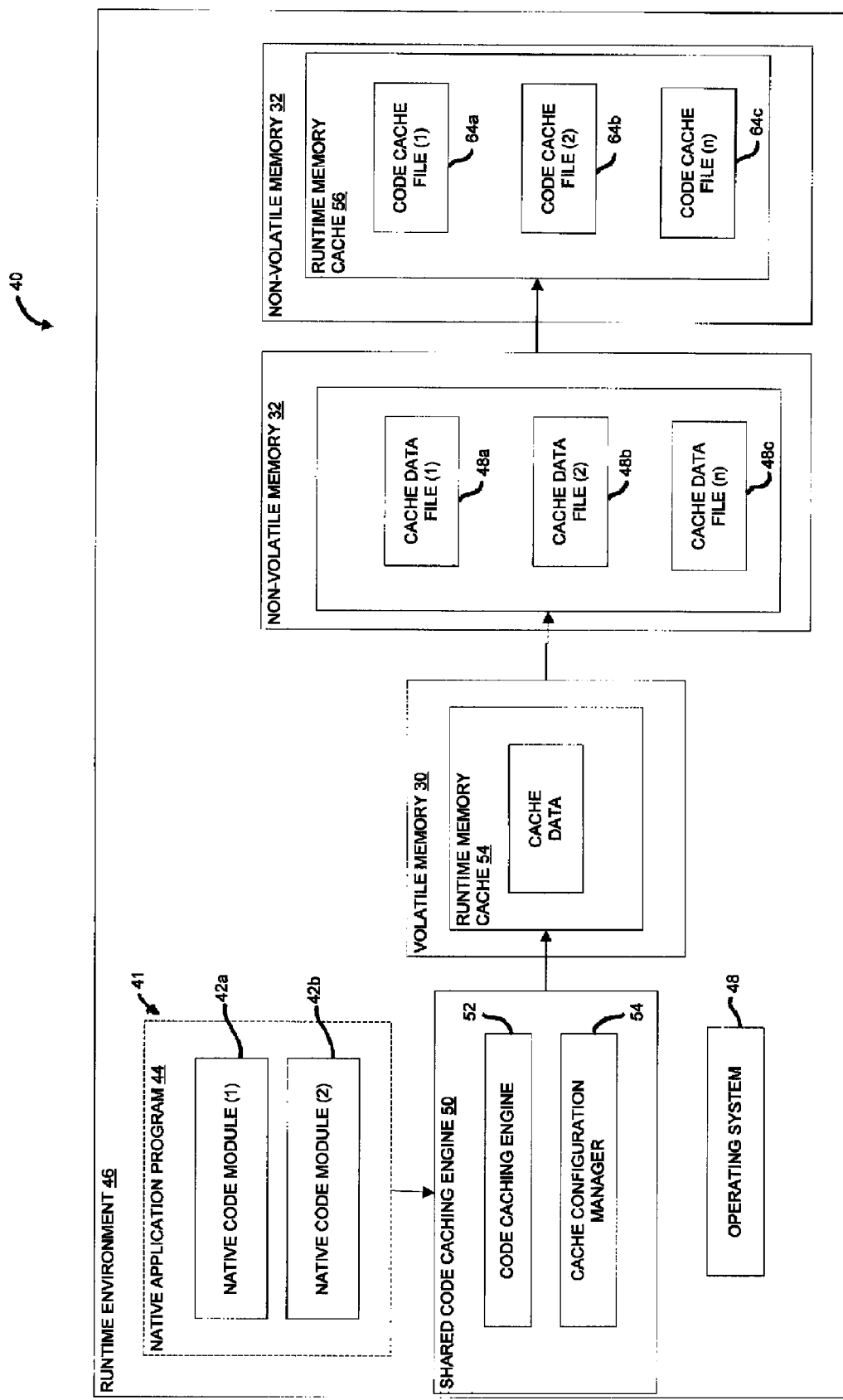
FIG. 2 is a block diagram of an exemplary computer architecture capable of executing a native code module of a native application program in a runtime environment.

An exemplary embodiment of a block diagram of a computer architecture 40 capable of executing a module 41, such as a native code module 42 used by a native application program 44 in a runtime environment 46, is illustrated in FIG. 2. An application program is a set of computer code that employs the capabilities of a processor 22 and computer system 20 to perform a task which a user wishes to perform. Application programs contain dynamic or static programming code in the form of instructions or data. At a higher level, application programs can be written in a platform independent language including for example, Pascal, C, or Java; or written in platform dependent programs. Application programs are stored on the computer system 20 or in a system that is a remotely located system, for example, on a host computer system 20 on which the application program is operated, and which may even be in another country.

In the runtime environment, an application program is compiled to generate a native code application program 44 which contains a translation of the application program code into native code. Native code comprises machine code or operating system code that is run directly by the physical processor 22, and in the context of an interpreted language, native code comprises platform dependent implementation of language features and libraries. The native application program 44 runs in the runtime environment 46 of a single platform being referenced. The native application program 44 can be organized into native code modules 42 such that the executable image itself and each shared library is a separate module. Each native code module 42a,b comprises a separately loadable file that can be separately loaded and executed, and which contains a library or executable computer code that is a translation of a file module of code from the application program translated to native code. While a native application program 44 and native code is used to illustrate the present system, non-native code application programs can also be used, thus, the scope of the claims should not be limited to native application programs.

During execution, the runtime environment 46 loads one or more portions of a single module 41, such as a native code module 42, into the volatile memory 30 of the computer system 20 such that the native code is accessible by the runtime environment 46. The runtime environment 46 is hosted by the operating system 48, which can include a virtual manager system, and can also include a runtime compiler. For example, the runtime environment 46 can be hosted by an operating system 48 such as Windows®, Linux or Apple OS®; or a virtual machine manager, such as VMWare™ virtual manager from VMWare Corp, California, or a Java Virtual Machine™ from Sun Microsystems, Inc., California.

The runtime environment 46 includes a shared code caching engine (SCCE) 50 which comprises a code caching engine 52 and a cache configuration manager 54. The SCCE 50 comprises code instruction sets for performing any one or more of the steps listed throughout this application. To avoid repetition, it is presumed that all the receiving, transforming, assigning, storing, computing, analysis, retrieval, comparing, and any steps are all written as code instructions in the SCCE 50. Further, the SCCE 50 can be composed of a single program or multiple programs, or divided and subdivided in any way that is convenient and apparent to those of ordinary skill in the art.

In the runtime environment, the SCCE 50 comprises code instruction sets for receiving native code comprising at least a portion of a single native code module 42, and more typically, native code from one or more of the modules 42. This native code is then stored as runtime data in a runtime memory cache 54 of the volatile memory 30 as cache data, for later execution by the processor 22 of the computer system 20. The runtime memory cache 56 allows the runtime environment 46 to reuse native code associated with the previously compiled application program that is called more than once. Typically, an entire native application program 44 or multiple programs, are loaded into the volatile memory 30. The native code in a native code module 42 that is associated with methods and objects called by the program 44 being executed or otherwise needed, is processed by the runtime environment 46. The runtime cache copy of the native code can be modified by, for example, changing or augmenting the original native code behavior. Such behavior can be, for example, to perform analysis, monitoring, profiling, or any of a number of other tasks. The copy of the native code can also be modified to ensure that the control stays within the code cache.

Figure 4:
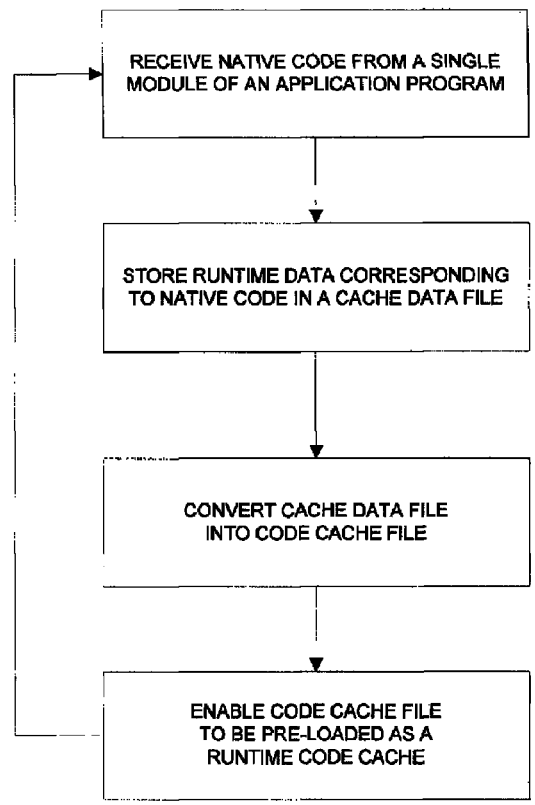
FIG. 4 is a flowchart showing the SCCE receiving native code modules from a native application program, storing data associated with native code as cache data files and using the cache data files to create a persistent and shared code cache.
Figure 3:
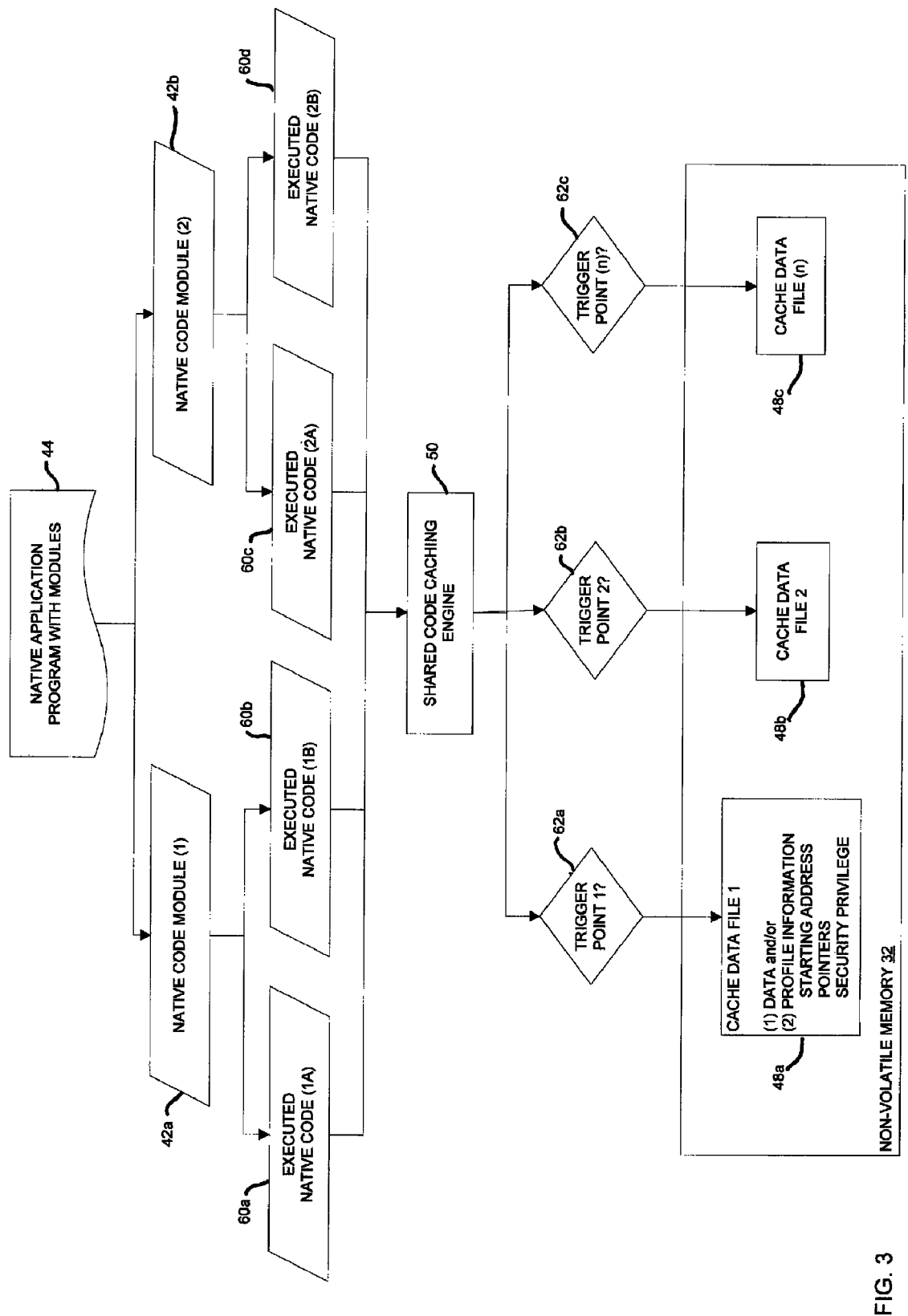
FIG. 3 is a diagram of an exemplary embodiment of data flow in a shared code caching engine (SCCE) from receiving the native code modules from the native application program to storing data associated with the native code as cache data files.

In one version, the SCCE 50 receives native code from native code modules 42a,b which are to be cached from the native application program 44, and stores runtime data corresponding to (i.e., associated with or representing the native code) as a cache data file 48a-c, as shown in FIG. 3. The cache data files 48a-c are later converted to persistent and shared code cache files, which are then enabled to be pre-loaded as a runtime code cache, as shown in FIG. 4. This process of receiving native code from a module 42 a,b; storing corresponding data in a cache data file 48a-c; converting the cache data files 48a-c to code cache files 64a-c; and enabling pre-loading of the code cache files is repeated a number of times to store a plurality of code cache files 64a-c at different locations in the non-volatile memory 32.

The native code modules 42a,b allow inter-process sharing of their read-only sections which contain code and read-only data. At the module level, the natural granularity of code cache sharing is a mirror of the native code. Larger units of sharing, such as combining multiple modules 42a,b, or sharing sequences of code that cross module boundaries, would be shareable only with other native application programs 44 that have loaded the same set of modules. By sharing only intra-module code, code cache sharing, removal, and versioning with the modular units of code that an application program loads, unloads, or updates for each module 42a,b, are aligned to facilitate these transactions. Furthermore, native code that is not contained in a module 42a,b is typically dynamically generated, and as such, this code is less likely to be used identically in multiple processes that would require inter-process code sharing, and is also more difficult to version and identify. While in this version, inter-process sharing is facilitated using code caches that contain translations of native application program code provided in the form of modules, the present code caching system can also be applied to other forms or types of code, and should further not be limited to application program comprising modules.

In a further version, the SCCE 50 receives executed native code 60a-d and creates code caches from the executed native code, to further increase processing efficiency and lower overheads, as shown in FIG. 3. While the native code received for code cache sharing can be both code which has already been executed or not yet executed, sharing code which has already been executed reduces translation time. By sharing only the executed native code 60a-d, static translation of an entire module 42a,b of a native application program 44 into a code cache is not needed. Instead of explicitly loading a module 42a,b in fragments, the demand paging of the operating system 48 is relied upon to bring into physical memory only the actual working set of the program 44 so that a program that uses very little of a module is not forced to load a shared code cache that contains more code than it needs. Further, resource usage is reduced because most native application programs 44 use a small fraction of any given shared library's native code which is a parallel situation to the present system of creating code caches. Accordingly, while both live caches and frozen caches can be shared, in one version, only frozen caches are shared. Live code caches or read-write caches are those to which data is still being actively added or removed. Frozen or read-only caches are those which are no longer being modified, and thus, no longer writable. Storing live caches can be more complex as this requires coordination among multiple processes when adding to the cache, as well as raising security and self-protection issues from the writable cache.

The SCCE 50 further comprises code instruction sets for storing the received code cache in cache data files 48a-c, as shown, or anonymous shared memory, to achieve inter-process code cache sharing. While both file-based and memory-based schemes can be used, storing code caches in the cache data files 48a-c allows both inter-process sharing and inter-execution persistence to be realizable from the same code cache design. Thus, in one version, to further improve scalability and cold code performance, the SCCE 50 stores data corresponding to a received native code module 42a,b in cache data files 48a-c in the non-volatile memory 32 of the computer system 20.

Figure 5A:
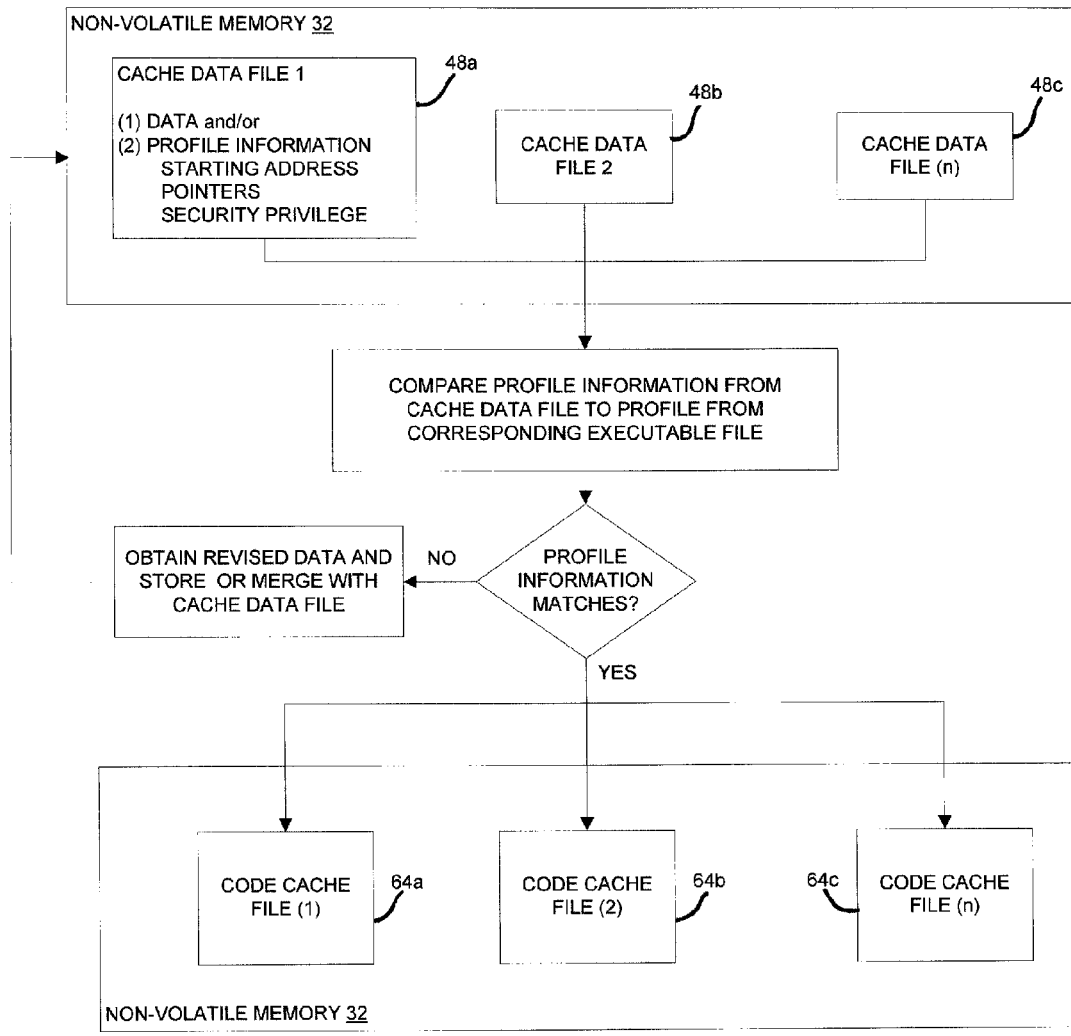
FIG. 5A is a process flowchart of a validation step in which profile information from a cache data file is checked against profile information from a corresponding executable file before the code cache file is written.

The data corresponding to the native code to be stored in cache data files 48a-c can be of different types. For example, the stored data can include the actual code itself, contain only profile information for a block of code in a native code module 42a,b, or contain other data. The profile information for a block of code from a native code module 42a,b of an application program contains information related to the block of code. For example, the profile information can contain the starting address of a block of code, or pointers which point to the location of a block of code, as shown in FIG. 5A. The stored data can also contain, or be associated with, a security privilege level corresponding to the security privilege level of the module. The security privilege level determines or sets the type of user that is allowed to write or rewrite the cache data file 48a-c. This step of associating each code cache data file 48a-c with a security privilege level prevents unauthorized writing to the cache data files 48a-c.

The data stored in a cache data file 48a-c can also be incrementally built from a plurality of blocks of executed native code (which can be a data set) that are received over time. Each block of executed code comprises at least a portion of a module 42 a,b. In this process step, the runtime data corresponding to the received blocks of executed native code is incrementally built up, and frozen and stored in a cache data file 48 a-c when a trigger point 62a-c is reached, as shown in FIG. 3. For example, a code cache can be frozen when a trigger point 62a-c comprising a preset or predetermined target data size is reached. A suitable target data size is from about 2 kB to about 64 kB, even at least about 8 kB. As another example, a code cache can be frozen at trigger point 62a-c comprising a module unload or process exit event occurrence. Incrementally building and then freezing the runtime data for the cache data file from the blocks of executed code that are received over time allows removal of links between native code blocks. This reduces space and execution time.

A cache data file 48a-c is created and stored in non-volatile memory 32 after a complete set of data is collected from one or more native code modules 42a,b for storage. After storage of a first cache data file 48a, data for computer code comprising other native code modules 42a,b is received, and a second cache data file 48b comprising another data set corresponding to the received code is stored. These steps are repeated to store a plurality of separate cache data files 48a-c at different locations in non-volatile memory 32. The non-volatile memory 32 is shared memory that can be simultaneously accessed by a number of different native application programs 44 to allow communication between the different programs. During runtime operation, code instruction sets in the SCCE 50 convert the stored cache data files 48a-c into code cache files 64a-c and store the same in the non-volatile memory 32, as shown in FIG. 2.

The SCCE 50 comprises code instruction sets to validate the data in each cache data file 48a-c against data corresponding to a current version of the native code of the original application program 44 before converting the cache data file 48a-c into a code cache file 64a-c. If the data is correctly validated, the SCCE 50 retrieves native code corresponding to the data in one or more of the cache data files 48a-c and writes the native code as one or more code cache files 64a-c. In the version shown in FIG. 5A, the validation check is performed by retrieving the profile information of the received native code from a stored cache data file 48a, and then validating this information against the profile information of a current version of the corresponding executable native code of the application program 44. If the profile information is correctly validated, executable native code corresponding to the data of a cache data file 48a-c is written to non-volatile memory 32 as a code cache file 64a-c. This process verifies the legitimacy of the data in a cache data file 48a-c before the corresponding code cache file 64a-c is stored. The code validation step can be used as a security check by the SCCE 50 when storing runtime data corresponding to the native code in a cache data file 48a-c in non-volatile memory 32. The validation and writing steps can also be performed in static mode to increase runtime efficiency.

Figure 5B:
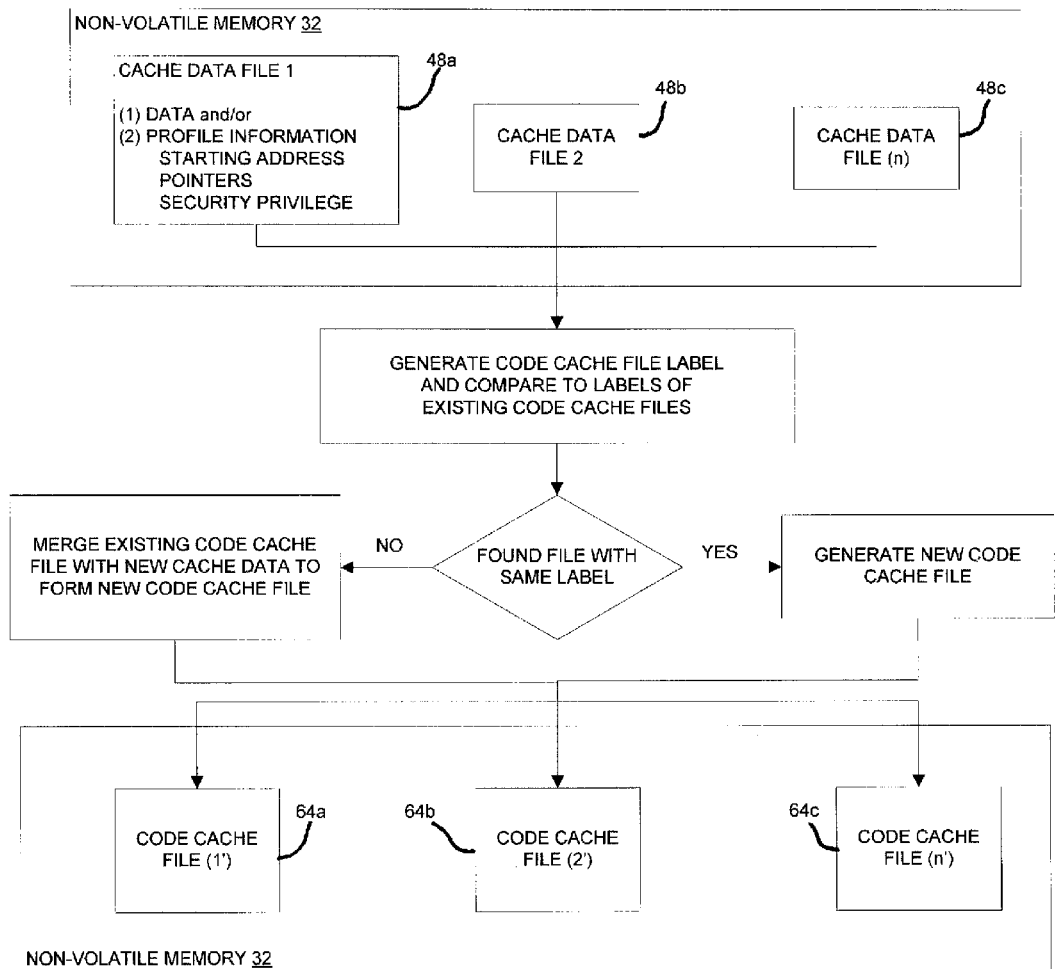
FIG. 5B is a process flowchart of a merge step in which a code cache file label of a file being created is compared to labels of existing code cache files and any pre-written code cache files having overlapping code are merged with the cache data file to form the new code cache file.

The SCCE 50 also comprises code instruction sets for writing new code cache files 64d-f by merging one or more existing cache data files 48a-c with portions of pre-written code cache files 64a-c, as shown in FIG. 5B. In a first step of the merge function, code cache file labels are compared. The code cache file label can be in the form of a canonical file name only or can be a file name combined with data in the file header. The code cache file label is capable of providing a mapping from source application code to code cache file. When creating a new code cache file, the label is calculated. The SCCE 50 compares the new file label with the existing file labels to determine whether a file with the same label already exists. The SCCE 50 comparison can be performed by checking the file names and optionally the headers. If a file by the same name exists, then the SCCE 50 merges a portion or all of one or more of the pre-written code cache files with the data of one or more of the cache data file 48a-c to form a new code cache file 64d-f. The merge function enables the SCCE 50 to add newly executed code to an existing code cache file.

The SCCE 50 comprises code instruction sets to check the code cache files 64a-c for consistency with the native code of the application program 44. This is particularly important if the application program 44 was changed between writing of the code cache files 64a-c and when the code cache files 64a-c are called to be loaded. In one version the SCCE 50 checks for consistency by calculating a checksum of the source native code and a checksum of the source native code that was stored in the code cache file 48a-c. The SCCE 50 then compares the current and stored native code checksums to check consistency between the stored runtime code cache and current native application code. If the checksums are the same, the executable code corresponding to the data in the runtime code cache file 68 has not changed. If the checksums are different, the SCCE 50 can generate one or more new cache data files and corresponding new code cache files. Alternately, to increase runtime efficiency, the SCCE 50 can mark the inconsistent code cache file as invalid and generate a new consistent code cache file in static mode.

The SCCE 50 is capable of checking the code cache files 64a-c for corruption. In one version the SCCE 50, when loading the code cache files 64a-c, computes the checksum of the code cache file 64a-c and compares the computed checksum against the stored checksum of the code cache file 64a-c. The stored and computed checksum comparison allows the SCCE 50 to check for corruption of the code cache file. If a code cache file fails the corruption check, the SCCE 50 can generate one or more new cache data files and the corresponding new code cache file. Alternately, to increase runtime efficiency, the SCCE 50 can mark the inconsistent code cache file as invalid and generate a new consistent code cache file in static mode.

Figure 5C:
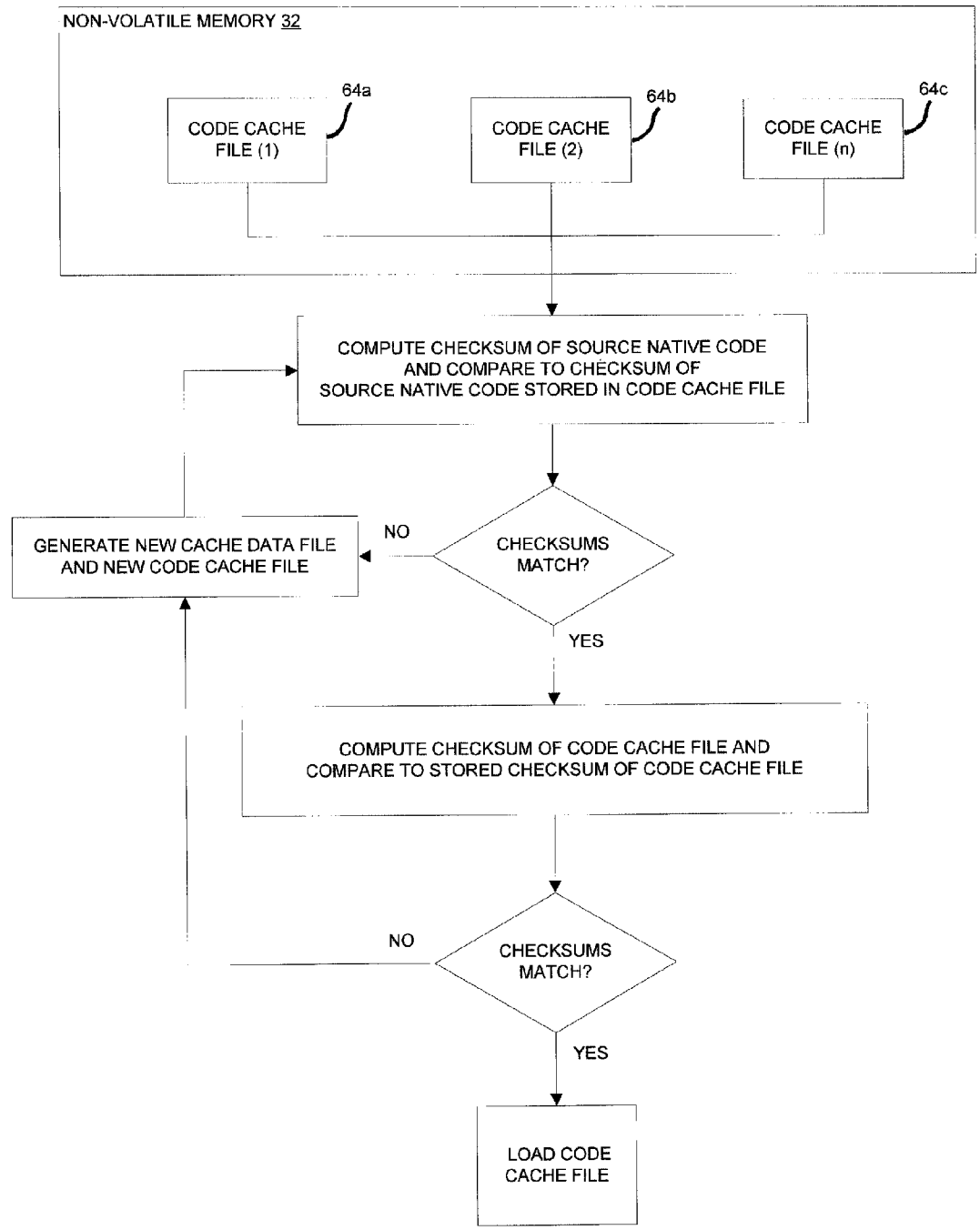
FIG. 5C is a process flowchart of a consistency and corruption check step that is performed before the code cache file is loaded.

In the version of FIG. 5C, a consistency check and then a corruption check are performed on the code cache files 64a-c before they are loaded. This enables the SCCE 50 to repair or replace inconsistent or corrupt code cache files on an as needed basis to reduce runtime error. After the consistency and corruption check are performed, a plurality of stored code cache files 64a-c are used to load a runtime code cache in volatile memory.

Security

The SCCE 50 further comprises code instruction sets that allow inter-process sharing of the persistent code caches 70a-c while reducing security threats raised by executing code from a persistent code cache file 70a-c built from native code. In the threat model, it is assumed that a local user is able to create a new file, or modify an existing persistent code cache 70a-c, and give it arbitrary contents, provided the user's privileges allow such file writes. A remote user could also do the same thing, either via an exploit that allows arbitrary execution or only allows file creation. Further, the inter-process code caching system introduces a new security vulnerability if a user who does not have privileges to write to an application program's executable or library files on disk is able to write to a persistent cache file that will be executed by that application program. For example, a remote user of an ftp server can legitimately write a file, but this remote user should not be allowed to create a code cache file 64a-c that will be picked up and executed by the next invocation of the ftp server.

Figure 6:
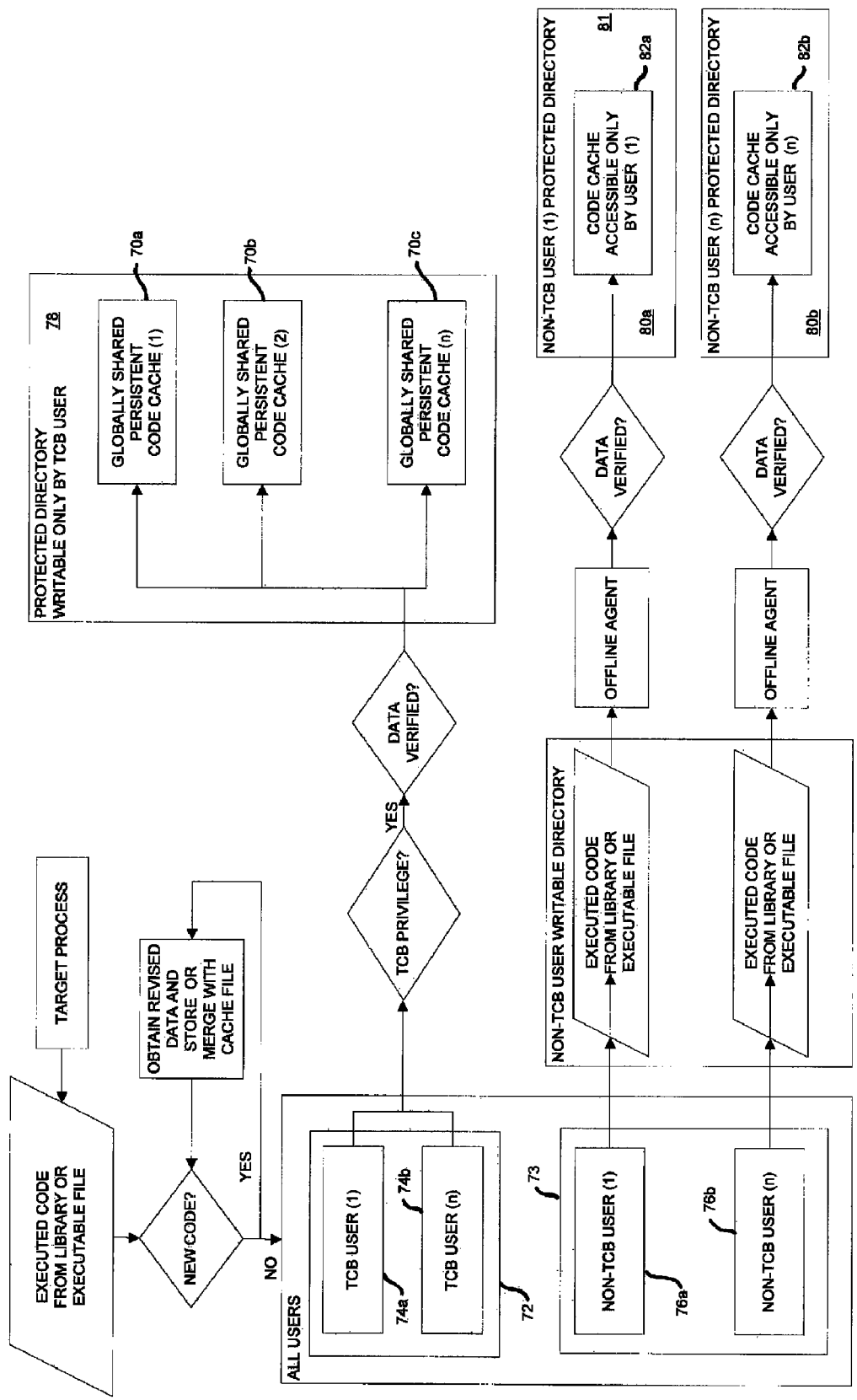
FIG. 6 is a process flowchart of a security scheme that reduces security threats while allowing inter-process sharing of the persistent code caches by limiting modification of persistent code cache files by a local or remote user to prevent privilege escalation.

In one embodiment, the SCCE 50 includes code instruction sets for reducing or limiting security threats by limiting modification of persistent code cache files 70a-c by a local or remote user to prevent privilege escalation, as shown, for example, in FIG. 6. Privilege escalation is a form of code modification and occurs when a low-privilege user is unintentionally allowed to control code executed by a higher-privilege user by creating or modifying a persisted code cache. Any inter-process communication used as part of the code cache sharing process, whether live or via file intermediaries, where a low-privilege process sends input to be acted on by a high-privilege process, is a potential vector of privilege escalation. The security risk of privilege escalation is avoided by preventing or not allowing a high-privilege process to execute a process-shared and persisted code cache generated by a low-privilege process. In other words, the code caches are enabled to be shared from high to low privileges, but cannot be shared from low to high privileges. In the system, a trusted computing base (TCB) 72 is formed from one or more trusted users 74a,b on the system, and a non-trusted computing base (TCB) 73 is formed from one or more non-trusted users 76a,b. For example, on Windows®, the trusted computing base (TCB) 72 is formed from the system user, while on UNIX it can be the root or some set of capabilities if privileges are finer-grained. The set of trusted users 74a,b in the TCB 72 are considered equivalent with respect to privilege escalation, and the lower-privilege users, such as the non-trusted users 76a,b are not part of the TCB 72. Thus the shared code caches form a two-level hierarchy with the TCB 72 and its associated trusted users 74a,b at the top, and all other users which include the non-trusted users 76a,b at the bottom.

In this system, the SCCE 50 comprises code instruction sets that store a code cache file converted from runtime data received from a trusted user 74a,b in a protected directory that is shareable by all users but writable only by a trusted user. Further, the SCCE 50 stores a code cache file converted from runtime data received from a non-trusted 76a,b user in a separate directory 82a,b that is isolated and accessible only by the particular non-trusted user who generated the runtime data. For example, a non-trusted user 76a,b can store runtime data corresponding to the native code in a cache data file in the non-volatile memory, and convert the cache data file to generate a code cache file. A trusted user 74a,b receives the code cache file generated by the non-trusted user 76a,b, verifies the code cache, and enables the code cache file to be pre-loaded as a runtime code cache.

Thus the runtime data is effectively stored in a location that is selected in relation to the security privilege level of the user running the application program. In this system, a code cache produced by a trusted user 74a,b is usable by everyone, while a code cache produced by any other non-trusted user 76a,b is only usable by that user. The bottom-level, non-trusted users 76a,b are isolated from each other. On Windows, many service processes run as System, enabling significant global sharing of the code caches corresponding to common shared library code. Further, to avoid allowing code modifiability, both types of persisted cache files are stored in protected directories 78, 80a,b writable only by trusted users 74a,b in the TCB 72. Any alternative requires full verification on each use of a code cache, which has significant performance implications (as well as requiring a verifier for the TCB caches, which we want to avoid). Even if an executable or library file is in fact writable by a lower-privilege user, we store its shareable persisted code cache in a protected directory for simplicity.

Also, a trusted user 74a,b is used to actually create the globally shared persistent cache code files 70a-c because shareable caches are stored in the protected directories 78,80. The trusted user 74a,b can statically generate the code caches such that each cache contains all of the code of a native module file. However, such static operations suffer from the limits of static analysis and they can contain incomplete or incorrect code identification. Missing code is acceptable as the missed code will be discovered at runtime. Data incorrectly treated as code, however, while usually innocuous since never legitimately reached, is a problem for security systems that do not want to allow possible malicious execution of such non-code. Also, in static generation of code caches, the entire module needs to be translated, while even the union of the code from that library used by all application program on the system is likely to be a fraction of the code in the module. Translation of all the code increases processing overhead time, while limiting shared code to code that is actually executed keeps code caches small and working sets compact, to significantly reduce overhead time.

Thus, a process running as a trusted user 74a,b is used to create each persistent code cache file 70a-c given information on what code was executed in a target process. In one version, the trusted user 74a,b receives only a list of starting basic block addresses to keep the input and vulnerability risk smaller. In another version, the trusted user 74a,b process receives a full-fledged persistent code cache from each target process and then simply verifies and publishes it. The full-fledged pre-published persisted caches are stored in a directory writable only by the producing user. This design uses (i) a single protected directory 78 of globally-shareable and persistent code cache files 70a-c which is writable only by users of the TCB 72, (ii) a plurality of user directories that each contain user-shareable code cache files writable only by the trusted user 74a,b, and (iii) a plurality of separate directories 80a,b for storing user-accessible code cache files 82 writable by each individual user, as shown in FIG. 6.

Verification involves ensuring that the code cache matches the native module code that it purports to represent, modulo translation performed by the runtime system. Publishing entails copying it to the protected directory 78, 80a,b with a name that makes it usable by other processes. The merging of new code with an existing persisted cache is left to the process of producing the new cache. While this decentralized merging combined with separate publishing can result in the loss of code if there is simultaneous production of new code from the same base cache, it does make the verifier simpler and thus further shrinks the set of security-critical code. Furthermore, the publishing step is executed in a restricted context with an inherited file handle and no other privileges, narrowing the vulnerability window further. In this step, the code cache is enabled to be pre-loaded as a runtime code cache with only an inherited file handle for security reasons to prevent malicious enabling. A file handle is a number that the operating system 48 assigns temporarily to a file when it is opened. The operating system 48 uses the file handle internally when accessing the file. A special region of the systems memory 27 is reserved for file handles, and the size of this area determines how many files can be open at once.

This cache generation scheme guarantees no privilege escalation, as nothing writable by other than the TCB 72 is ever an input to the verifier when producing a TCB globally-shared persistent cache file 70*a-c*. For non-TCB cache files, there is a possibility of code modifiability where it did not exist before, if there is an error in the verifier. This is considered an acceptable risk, and much less serious than the risk of privilege escalation when using a verifier across privilege levels. There are often other existing vectors for executing new code at an existing privilege level given the threat model of local or remote write access.

The high-privilege process could use code caches created by a lower-privilege process by verifying that the cache matches the original code. However, guaranteeing that the verifier is both complete and free of exploitable errors is difficult to achieve in practice. Thus, there would still exist a potential vector that does not exist natively for full compromise of the high-privilege process by a low-privilege process. The high to low privilege sharing only scheme prevents such privilege escalation risk.

Verifying Cache Consistency

In addition to ensuring that cache data files have not been forged and were legitimately generated from executed application program code, the cache data files need to be kept synchronized with the application program code. Application program executables and libraries change over time by the addition or deletion of code provided as patches, security updates, or feature upgrades, to produce new versions on a regular basis, while local tools such as rebasing optimizers also legitimately modify module files. A persisted code cache needs to be invalidated and/or rewritten if the current version of the corresponding application program module has different code than that stored in the cache at the time of persistence. In the perceived threat model, an adversary who is able to maliciously modify an application program module is more cause for worry than tricking a code caching system into executing code that the adversary can just as easily have executed natively. Consistency checks are primarily to support legitimate module changes.

A full consistency check, a byte-by-byte comparison, is made between code in the persisted cache and the module code. However, to reduce overhead, the full check is performed only offline during verification, and prior to publishing the code.

Figure 7:
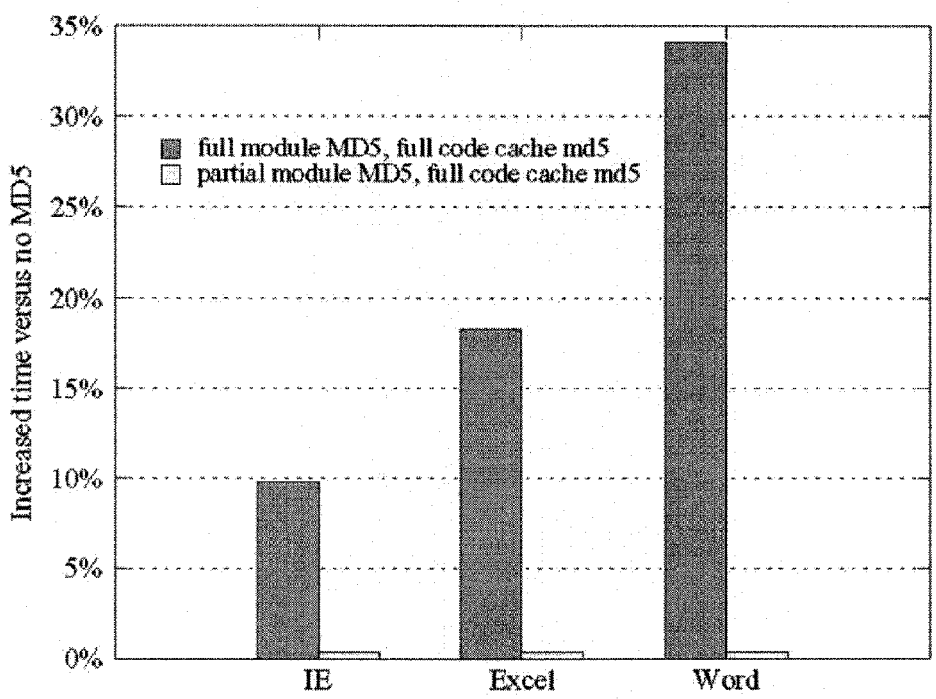
FIG. 7 is a bar graph showing the increased overhead time resulting from consistency checks of full MD5 checks of the entire code of a module or partial checks of the code for modules from files of (i) Microsoft Internet Explorer®, (ii) Microsoft Excel®, and (iii) Microsoft Word®.

In a first order consistency check, the SCCE 50 comprises code instruction sets for checking code in a persisted and shared cache against the current version of code of the equivalent file module by checking the checksum and/or size of the cached code. Multiple simultaneous versions are supported with no additional overhead if these parameters are used to calculate the identifier in the shared cache namespace. The first order check using checksums is performed at load time. At load time, an MD5 checksum of the module code section (which is the only part of the module that matters to the persisted cache) that is stored in the persisted cache file is checked versus the in-memory module. However, even this checksum calculation increases overhead runtime. FIG. 7 shows that the overhead time increases when performing consistency checks of full MD5 checks of the entire code of a module or partial checks of the code for modules from files of (i) Microsoft Internet Explorer®, (ii) Microsoft Excel®, and (iii) Microsoft Word®. It is seen that performing full MD5 consistency checks increases the overhead time by greater than 30% for modules from the files of Microsoft Word®, increases overhead time by more than 15% for Microsoft Excel® files, and increases overhead time by close to 10% for Microsoft Internet Explorer® files.

Thus, to further increase efficiency, in one version, the checksum includes only an MD5 of the first and last pages of the module. This version will catch any update produced with a standard linker but may miss a manual modification using a hex editor that does not update any of the header fields, which is a relative low risk for the performance benefit.

In addition, a persisted code cache should also be checked for self-consistency and completeness to guard against disk corruption or other errors. To minimize instances of incomplete files, when a file is produced it is first created as a temporary file. This temporary file is renamed to the official name only after the data is fully written and the disk cache flushed. The MD5 of the first and last pages of the persisted cache data file are also stored and checked, which incurs no noticeable overhead.

The typical usage model of a code caching tool is to use it to control a process for its whole lifetime, where the tool can process each library as it is loaded, prior to any potential modification in memory. If instead a dynamic SCCE attaches to a process after process initialization, a full text section checksum comparison should be done to detect modifications of the in-memory image. This check should, however, allow legitimate library modifications performed by the loader for rebasing and rebinding.

Implementation

The process-shared and persistent code caches were implemented by a SCCE 50 comprising a native-to-native dynamic shared code caching engine. The SCCE 50 operates in-process and executes each target application program out of its own basic block code cache. After the blocks of native code are received by the SCCE 50, a code caching scheme is selected for each block of native code by code instruction sets in the SCCE 50, to store runtime data corresponding to the block of native code. For example, the SCCE 50 comprises code instruction sets for selecting a fine-grained scheme of code caching to provide fine-grained control over code caches and allow unlinking (removing all incoming and outgoing jumps) and deletion of individual blocks. In the fine-grain scheme, each separable division comprises a block of native code having a single entry point at the start of the block. The fine-grain scheme uses a plurality of data structures for each block of received native code.

In one version, the fine-grained version is implemented using several types of data structures, including a data structure for each: (1) block of code; (2) exit from each block; (3) additional memory region that a block covers beyond its starting address; (4) a list of incoming direct links to each block; and (5) a back pointer from each code cache slot to that block's corresponding data structure. However, two problems need to be resolved to maintain the same set of data structures in a process-shared code cache. First, the read-only structures should be separated from the writable and placed on different pages. This problem is solved by storing the shared code caches and data structures only on read-only pages. Pointers to absolute addresses can also be converted into relocatable addresses, to allow both application program modules and code caches to occupy different addresses in different processes. Relocated libraries are more frequently found in modern operating systems 48 which support address-space randomization; and guaranteeing that the same address is available when loading a shared code cache cannot always be done. This approach also reduces the number of writable pages in the runtime system, and the fewer the pages, the fewer the opportunities for malicious or inadvertent writes to interfere with proper execution. Further, reducing the number of data structures by avoiding pointers and writable pages saves more memory.

The SCCE 50 further comprises code instruction sets for selecting a coarse-grained scheme for operating in a coarse granularity (larger than a block of code) scheme, as opposed to aforementioned fine-grained (per-block control) scheme. In the coarse-grain scheme, each separable division comprises runtime data corresponding to native code from a single module of the application program. The coarse grained scheme uses data structures per module and does not use data structures per block. The coarse-grain cache has no per-block data structures at all, other than an entry in a hash table identifying the code cache entry point corresponding to the original application program address. That hash table value is an offset from the code cache start, rather than an absolute address. The hash table (also know as a hash map) is a data structure that associates keys with values to efficiently support lookup operations. Given a key of a code cache entry point corresponding to the original application program address, the corresponding block of code for a code cache can be efficiently located by transforming the key using a hash function. The hash function transforms the key into a hash which is a number that is used as an index in an array to locate the desired location or bucket where the values should be located. Using the hash table, the time spent searching for the required data is often independent of the number of items stored. To achieve this design, some of the power of the fine-grained approach was given up by not supporting individual deletion, and supporting individual unlinking only for external links; blocks are not allowed to cross memory regions (they are split); and while iterating over the code cache takes more overhead, it is not needed for cache management as the entire code cache for a particular module is treated as one unit that should be deleted all at once.

Many different types of hash functions can be used. As an example, for a hash table of capacity n, on a computer with word size W (i.e., all arithmetic is done modulo W), one of following two hash functions can be used:

f1(x)=a*x mod n, where a is a constant power of two; or f2(x)=b*x mod n, where b is the integer that is relatively prime to W that is closest to the inverse of the golden ratio (sqrt(5)−1)/2) multiplied by W.

The f2 hash function is commonly known as Fibonacci hashing.

Figure 8:
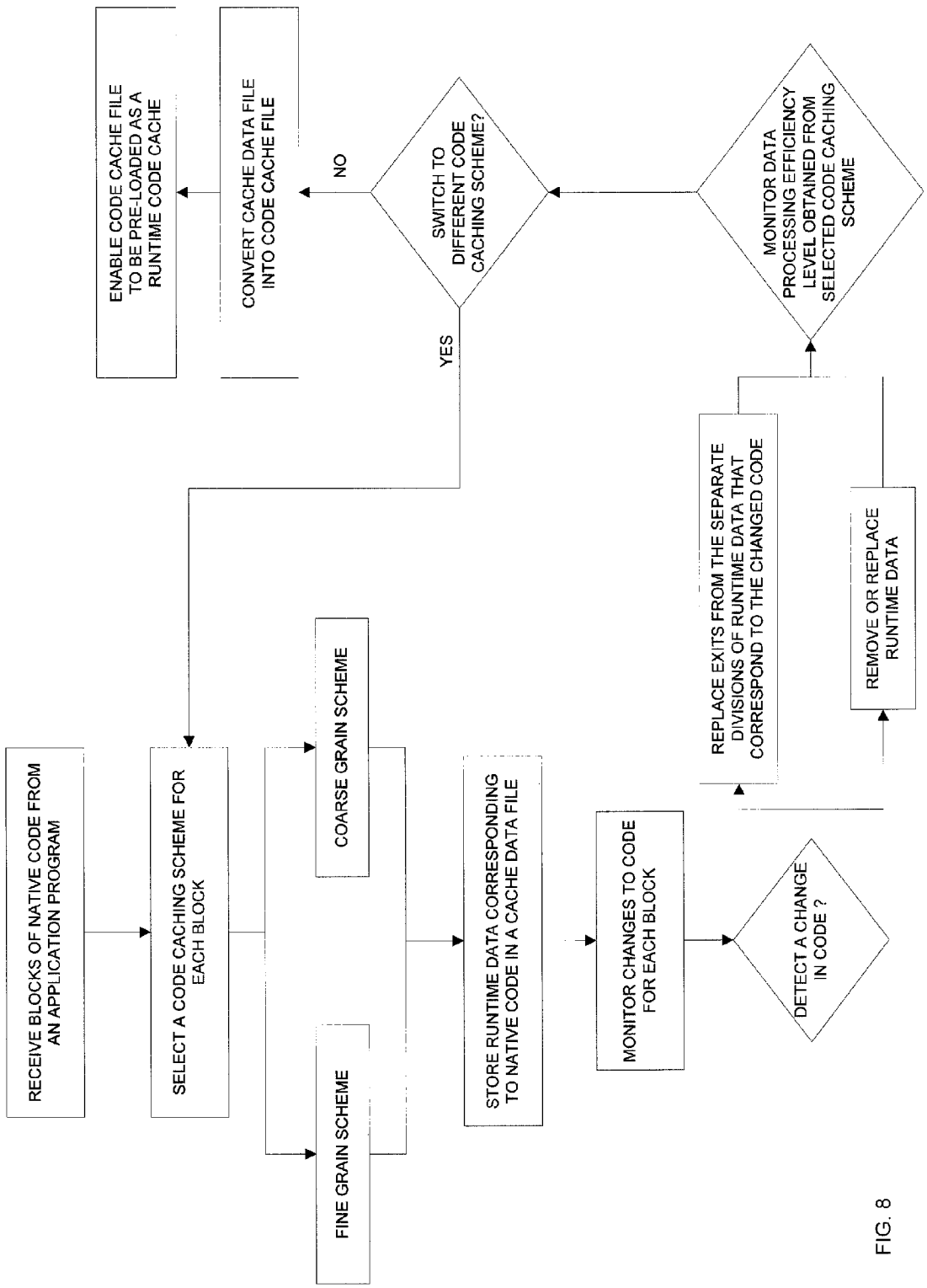
FIG. 8 is a process flow chart showing the selection of a fine-grained or coarse-grained code caching scheme for each block of code received by the SCCE, monitoring changes and data processing efficiency, and switching to an alternate scheme.

The SCCE 50 can also have code instruction sets for selecting a code caching scheme for each block of native code from at least two different code caching schemes that each comprise a different demarcation of the runtime data into separable divisions of runtime data that can each be individually removed, replaced, or have their entrances or exits modified. In this example, shown in FIG. 8, the SCCE 50 uses both fine and coarse-grained schemes, and switches from a coarse-grained code cache to a fine-grained cache, or uses both schemes for a particular module when it experiences numerous consistency events. For example, finer-grained code cache deletion may be desirable for cache consistency-intensive application module, such as those with dynamically-generated or modified code.

Thus for dynamically generated or modified code, the SCCE 50 comprises code instruction sets for switching from course-grained code cache to fine-grained one. In this system, each block of native code is monitored for changes to the native code. Upon detecting a change in the native code of the application program, the SCCE 50 removes or replaces the runtime data, or replaces the exits from the separable divisions of runtime data that corresponds to the changed computer code.

Further, the SCCE 50 comprises code instruction sets for monitoring the data processing efficiency level obtained from the selected code caching scheme by measuring the amount of cached computer code that is removed or replaced. For example, the data processing efficiency level can be monitored by determining the number of code modifications that are performed. Depending on the monitored data processing efficiency level, the SCCE 50 determines whether to switch to a different code caching scheme in relation to the measured efficiency level. This selection, monitoring and switching system allows dynamic selection of an efficient scheme for storing runtime data. For example, the selected code caching scheme can be switched to another alternate scheme when the number of code modifications exceeds a threshold value.

The SCCE 50 also has code instruction sets for setting particular blocks inside a module that are primarily coarse-grained to be fine-grained. This adaptive and side-by-side granularity is capable of ignoring problems that would make a coarse-grained strategy more difficult to achieve while still allowing the fine-grained management to handle all of the corner cases. While the non-coarse code is not persisted or shared because the majority of code executed by a typical application program is unchanging code residing in libraries, and all of this code is coarse-grained and thus shareable and persistable in the present design.

In addition to changing the data structures to support sharing and persistence, certain code transformations which are normally applied were changed only for the coarse-grain code caches. They primarily involve local optimizations on the application program code as it is copied into the code cache. Because each module's coarse-grain cache is treated as a single unit, we cannot elide direct unconditional jumps or calls that target separate non-coarse memory regions (such jumps are often removed by code caching systems as an optimization). Inter-module direct transfers do not normally happen natively but are enabled in our system by an optimization converting indirect calls through an import table into direct calls. Even intra-module elision is problematic: if a module contains a sub-region of code that has been written to by the application program and thus been converted to fine-grained, the remaining coarse-grain code is kept separated.

Also, the persisted code caches should be not only execution-independent but also microarchitecture-independent to allow sharing of persisted caches across network file systems. The present system uses the underlying cache line size for correctness and for optimizations. For correctness, on IA-32 any data or code written without high-level synchronization should not cross cache lines. Blocks in the code cache are linked and unlinked by writing to the four-byte operand of each jump instruction; when each block is emitted into the cache the start alignment of the block should be tweaked with inserted padding to ensure that those operands do not cross cache lines. Performance-critical routines like the indirect branch lookup routine and performance-critical data like the scratch space are cache-line aligned. To produce a microarchitecture-independent persisted cache, it is desirable to align for correctness assuming the smallest supported cache line size, but optimize assuming the largest size. The cache line size is stored in the persisted cache header and a cache is used only if the current size lies in the range supported by that cache.

Further, the scratch space is accessed through segment offsets. It is desirable to obtain the same offset in every process, but it is not guaranteed to be constant. The offset is stored in the persisted cache header and matched to the current offset to use the cache. Also, transformations of application program call instructions result in absolute addresses in the code cache, which are problematic for module relocation, as discussed later.

Linking

This section describes how components of the persisted and shared code caches are linked together. The coarse-grain code caches are built incrementally, in application program execution order. However, when code is to be persisted, the layout of the code is improved. A freezing step is performed prior to persisting the code. During the freezing step, each block's successor (fall-through target) is copied to the slot immediately after the block, to elide the jump instruction linking the two blocks. This shrinks the code cache by about ten percent. Exit stub trampolines (which are used in unfrozen coarse units for more flexible linking) linking two blocks are also eliminated, and instead, a direct jump is used in between them. An exit stub trampoline is a short piece of code used when a control transfer's target is not present in the code cache. The control transfer jumps to the exit stub trampoline, which records the desired target and then transfers control to the SCCE.

Any exits from the frozen cache whose targets are not present need to use exit stub trampolines. These stubs are kept separate from the code cache, both because they are writable and to keep the code cache more compact. A block targeting a stub reaches it via a hardcoded jump that never changes. If the block is later linked when its target materializes (as a non-frozen coarse-grain block, a fine-grain block, or a frozen coarse-grain block in a separate persisted module) the link will be routed through the stub. This is in contrast to fine-grained blocks, which can directly link to newly realized targets, as they are writable (and there are no jump reachability limitations on IA-32).

A link between persisted modules is routed through a stub at the source module, but directly targets the code cache entry point at the target module. An incoming link data structure (one list for each module) tracks these incoming jumps, enabling unlinking if one or the other of the modules is unloaded or invalidated.

A persisted module's exit stubs are kept read-only and made writable each time an exit from the code cache is linked to a new block, whether in another persisted module (which is rare: typically indirect transfers are used between modules) or in the same module but not part of the persistent cache. In steady state, once all code has been persisted, the stubs are not made writable.

Achieving efficient read-only stubs requires persisting as much of a module's code as possible, to minimize external links from code that is persisted. One common complication is a module with its import address table in the middle of two adjacent text sections, and on the same page as code. This table is normally read-only, but it is written by the loader during rebinding. We special-case this table writing to avoid converting any of the code to fine-grained mode, which is not persistable.

The target of a stub that exits the code cache, as well as an exit from a block ending in an indirect branch, are routed through special jump trampolines located in a separate location in the code cache file. This indirection allows hardcoded jumps from the code cache to remain read-only. At load time these indirection trampolines are written just once to point at the appropriate runtime routines.

As described earlier, the code caches are shared in a two-level hierarchy as shown in FIG. 6, namely TCB caches 70a-c which are globally shared and persistent code caches produced by the trusted computing base (TCB 72), and user code caches 82a-b which are produced by a current user and accessible only by that user. Only code not present in the TCB directory 78 will be found in a user code cache 82a,b which is in the non-TCB user directory 81. Exit stubs from the user cache 82a,b whose targets exist in the TCB directory 78 will be linked directly to the TCB code cache 70a-c at load time. As the user code cache 82a,b depends on a particular version of a TCB cache 70a-c, it stores that version information in its header. If the particular TCB cache 70a-c is updated, any code in the associated user cache 82a,b that is now redundant can be removed, or simply thrown out and the user cache 82a,b re-created again.

Relocation

One form of application program dynamism that complicates persisted code caches is runtime code generation and modification, which we handle by reverting to the fine-grain code cache, as discussed. Another form is library relocation, which is becoming more prevalent as operating systems 48 employ address space layer randomization (ASLR) for security reasons. There are two challenges of relocation: relocating application program code and relocating non-application program instructions inserted by the code caching system.

In order to be successfully relocated natively, application program modules should either be position-independent or contain relocation records for load-time re-basing. If the application program code is position-independent, no additional work need be done by a native-to-native code caching system for those application program instructions that are copied verbatim into its code cache. Unfortunately, IA-32 Windows libraries are not position independent and instead contain relocation records. So the code caching system should use those records to re-base its code cache whenever a library is loaded at a different address. The re-basing process ruins sharing by writing to many of the code pages and making them process-private via copy-on-write. However, the native modules suffer from the same lack of sharing, so scalability versus native execution is not adversely affected.

In addition to relocating the application program instructions, any absolute application program addresses stored in data structures should also be updated. To avoid such updates, absolute addresses are not stored, and instead, offsets from the module base are stored in the hash table.

The second challenge is in relocating translated and inserted instructions that contain absolute addresses (an alternative is to convert the translation into position-independent code, which is not always easy to do efficiently). The most common instance is the translation of a call instruction into a push immediate followed by a jmp instruction. The immediate value is an absolute application program address that should be relocated. Another instance is a jump out of the code cache to perform an indirect branch lookup or to exit the cache back to the runtime system proper. On IA-32, near jumps are pc-relative, making their targets dependent on the instruction location. Indirection is used to keep each block and stub jump unchanging, leaving only the central jump trampolines to update at load time.

One final instance of absolute addresses is scratch space when it is not located in a register (or on the stack, though that is not transparent): an absolute address or a segment offset.

This is addressed by accessing the scratch space through segment offsets as discussed earlier.

Relocation also complicates persisted cache accumulation. In one version, the first persisted code is considered to specify the canonical module base, and later code additions are relocated prior to appending to the persisted file.

Cache Layout

Figure 9:
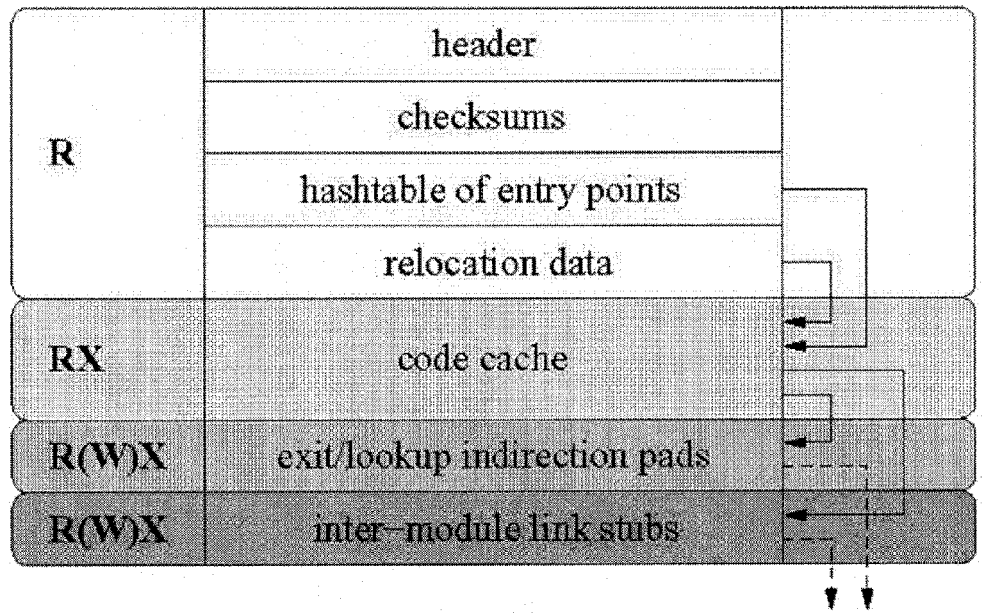
FIG. 9 is a schematic diagram of an exemplary layout for a persistent cache.

An exemplary embodiment of a layout for the persisted caches is illustrated in FIG. 9. The header contains version information both for the application program module source of the code cache and for the runtime system that produced the cache, along with a section directory. Checksums are stored for consistency checks as described earlier. The hashtable of entry points identifies which blocks of application program code are present in the code cache, while the relocation data is used when the module is loaded at other than the address at which it was persisted. The two temporarily-writable sections are used for indirection and linking. The indirection pads are written once at load time but are read-only afterward, while the inter-module link stubs are kept read-only but made writable each time an exit from the code cache is linked to a new block. Thus, the code cache file includes at least one read-only section that can be switched to a writable section when a link to a target outside the code cache file is called at runtime and switched back to a read-only section after performing the link. The cache layout was designed to be as position-independent as possible, with internal links within and among sections but all external links isolated to the two writable sections. This allows for maximum sharing among processes by keeping as much of the image read-only as possible. While an exemplary cache layout is illustrated herein, it should be understood that other cache layouts can be used, and the exemplary layout provided herein should not be used to limit the scope of the present invention.

Instrumentation

Dynamic instrumentation engines support building custom tools that insert instrumentation into the code cache. However, the persistent and shared code caches introduce two new problems: whether instrumentation should be preserved when persisting, and how instrumentation should be applied when using a persisted cache.

Inter-execution or inter-application program re-use of instrumentation depends on the same tool being re-applied. Therefore the persistent cache header should indicate whether any instrumentation is present in the code cache, and if so, identify the tool and its version. The namespace of persisted code caches should include the tool identifier to support multiple simultaneous code caches for the same module but with different instrumentation. Another process (including a later instance of the same application program) will only load an instrumented cache if the tool matches. As the typical tool usage model is to apply the same user-defined tool systemwide, rather than using a disparate set of tools simultaneously, tying the persisted files to the particular tool in use can work well. Tools that employ dynamically varying instrumentation can specify that their instrumentation should not be preserved. Finally, each tool should provide relocation information, or produce position-independent code.

With the scheme above, when a tool is executed for the first time, none of the persisted caches will be loaded because of a tool mismatch (the empty tool versus the present tool results in no match for an uninstrumented cache). An alternative is to change the model of inserting instrumentation and allow modification of persisted caches. Instead of changing code as it is copied into the cache, the tool instead inserts trampolines into the code cache. This is similar to the instrumentation process when modifying application program code directly, without some of the pitfalls: since the code cache consists of dynamic basic blocks, all entry points are known, and each block can be padded to ensure that jump instructions can be inserted safely. For tools that do not apply systematic code translations and insert only a few calls to instrumentation routines, this model could work well and maintain sharing of most pages of the code cache.

Evaluation of Scalability and Performance

Process-shared and persistent code caches according to the present design were implemented in an industrial-strength dynamic binary translation system targeting IA-32. The boot numbers provided here are for a Lenovo desktop with a Core 2 Duo 2.2 GHz processor 22 running Windows XP with 2 GB of RAM, while the desktop application programs were run on a Dell Latitude D610 laptop with a Pentium M 2.2 GHz processor 22 running Windows XP with 2 GB of RAM.

The first scalability test focuses on applying the code caching system on a system wide basis, i.e., on every process on the system. Memory usage was measured during boot and logon to a machine. The auto-logon was used for automation and the machine was considered fully booted once it reached an idle state.

The peak committed memory beyond native usage during boot and logon for each of five different configurations: fine-grain, coarse-grain without process-shared code caches, coarse-grain caches shared among all processes, coarse-grain caches shared in a two-level scheme used by the present engine, and coarse-grain caches shared only among each user but not between users, is shown in FIG. 10. Native usage was 135 MB. Every Windows service and logon process was run under control of the code cache, with a total of 27 processes executed (including some running our idle detection script) and 15 of those still running at idle time. These processes execute as four different users. It is seen that the coarse-grain code cache design alone, independent of sharing, provides noticeable memory savings due to the reduction in data structures. With sharing, significant additional savings were observed. The two-level design approaches the memory savings of unrestricted sharing, reducing memory usage by two-thirds, while minimizing any sacrifice in security.

Code cache sizes relative to native module code sizes for the fifteen largest code caches from the caches shared among all users (the configuration with the largest caches) in the boot benchmark, along with the average over all 206 modules, is shown in FIG. 11. The original size is the code size prior to translation for placing into the code cache. The ratios are shown considering only un-translated code as well as the translated code cache size. The code caches of the present system had an expansion ratio of about 70%, primarily from indirect branch processing code. Even sharing among 27 processes, only a fraction of the code in each module is executed, at an average of about $\frac{1}{7}$ (one-seventh). In the second test, ten instances of a single application program were run simultaneously, for two large desktop application programs, namely Microsoft Internet Explorer® and Microsoft Excel 2000®, both from Microsoft Corporation, Seattle, Wash. It should be noted that Microsoft Word® was omitted from the ten-instances test as it is designed to never start a second process.

The pagefile usage of the processes executing simultaneously: natively, without process-shared code caches, and with process-shared code caches are shown in FIG. 12. It was found that inter-process sharing eliminated over 70% of the additional memory usage of the code caching system. This was a significant amount of memory savings.

The process-shared code cache design also supports persistent code caches. Persistence improves performance of cold application program code: initialization sequences or execution of short-lived processes, where there are limited opportunities for amortization of overhead. The comparative startup performance achieved by the present code cache design with and without persistent code caches, for each of three typical large desktop application programs: Microsoft Internet Explorer®, Microsoft Excel®, and Microsoft Word 2000®, are shown in FIG. 13. The application programs are started up and then immediately shut down, and the startup performance was measured as the time to start up and shut down the application programs. The benchmarks were fully automated, using the macro capabilities of Excel and Word, and using Javascript with Internet Explorer in order to perform the shutdown without user input.

The breakdown of the time spent when starting up and shutting down Internet Explorer 6.0, Excel 2000, and Word 2000, is shown in FIG. 14. It is seen that when persisted caches were not used, the time copying blocks of code into the code cache dominates execution time. Persisting the code caches removed nearly all of the code cache creation time, shrinking runtime by 60 to 70%.

Generation of cache data files is a rare event compared to their use, making the performance of creating the files less important. If starting from scratch and generating dozens of new files at once, a delay of a few seconds can be measured, but that is a one-time event as subsequent runs incur zero cost. Generation can be staged to reduce the cost, but in the present system it was not deemed particularly necessary.

The code caching sharing apparatus and methods according to the present invention facilitate deployment of dynamic code caching tools on many processes simultaneously by improving scalability. The software code caches can also be shared among multiple processes in a secure manner by preventing privilege escalation. Further, the shared code caches reduce the risk of malicious or inadvertent data corruption. Code cache persistence is also supported for improved performance during initialization or execution of short-lived processes, areas where code caches traditionally have poor performance due to limited opportunities for amortization of overhead. Implementing the design in an industrial-strength dynamic instrumentation engine shows that persistent code caches achieve a 60 to 70% reduction in startup time and reduce memory usage by two-thirds.

The present systems and code have described with reference to certain exemplary versions; however, other versions are possible as would be apparent to those of ordinary skill in the art. For example, different types of code cache layouts; cache validation, coherence and corruption checks; security schemes; and other linking systems, data structures and code transformations can also be used. Further, alternative steps equivalent to those described for the relocation method can also be used in accordance with the parameters of the described implementation, as would be apparent to one of ordinary skill. Therefore, the spirit and scope of the appended claims should not be limited to the description of the preferred versions contained herein.

What is claimed is:

1. A method of caching computer code from an application program comprising a plurality of modules that each comprise a separately loadable file, the method performed on a computer system comprising non-volatile memory and volatile memory, the method comprising:
 (a) receiving native code comprising at least a portion of a single module of the application program;
 (b) storing runtime data corresponding to the native code in a cache data file in the non-volatile memory, wherein the runtime data comprises profile information separate from the native code;
 (b') validating the cache data file with the native code based on the stored runtime data;
 (c) converting the cache data file into a code cache file, wherein the converting comprises using the profile information to write the native code into the code cache file;
 (d) enabling the code cache file to be pre-loaded as a runtime code cache; and
 (e) repeating (a) through (d), to store a plurality of separate code cache files at different locations in the non-volatile memory.

2. A method according to claim 1 wherein (a) comprises receiving native code corresponding to executed native code.

3. A method according to claim 2 wherein (a) comprises receiving a plurality of blocks of executed native code received over time, and wherein (b) comprises incrementally building the runtime data for the cache data file from received code, and when a trigger point is reached, freezing and storing the runtime data corresponding to the received code in the cache data file.

4. A method according to claim 3 comprising freezing the runtime data when a trigger point comprising a target data size is reached.

5. A method according to claim 3 comprising freezing the runtime data when a trigger point comprising a module unload or process exit event occurs.

6. A method according to claim 3 wherein (b) or (c) includes copying a successor block of native code that succeeds the frozen block of native code, to the slot immediately after the frozen block of native code, to elide the jump instruction linking the two blocks of code.

7. A method according to claim 3 wherein (b) or (c) includes replacing one or more exit stub trampolines that link two blocks of native code with a direct jump instruction.

8. A method according to claim 3 wherein (b) or (c) comprises using an incoming link data structure to store and track incoming transfer instructions to the entry point of a successor block of native code to enable unlinking if the successor block or its predecessor block of native code is unloaded or invalidated.

9. A method according to claim 3 wherein in (b) or (c), exit stub trampolines in a frozen block of native code whose successor blocks of native code are not present, are stored as exit stub trampolines in a separate location from the cache data file or code cache file.

10. A method according to claim 9 wherein an exit stub trampoline from a block of native code is kept read-only and made temporarily writable each time an exit from the frozen block of code is linked to a new block of native code.

11. A method according to claim 3 wherein (b) or (c) includes routing a target of an exit stub trampoline that exits the code cache file through special jump trampolines located in a separate location in the cache data file or code cache file.

12. A method according to claim 3 wherein (b) or (c) includes comprising routing as an exit stub trampoline from a block of native code that ends in an indirect branch through special jump trampolines located in a separate location in the cache data file or code cache file.

13. A method according to claim 1 wherein the cache data file or the code cache file has the following layout: (a) a header containing version information for (i) the native code of the module of the application program which is stored as runtime data in the cache data file, (ii) the runtime system that produced the code cache, and (iii) a section directory; (b) at least one of a checksum of native code or a checksum of the cache data file; (c) a hash table of entry points which identify the blocks of native code present in the code cache file; (d) relocation data which is used when the native code of the module of the application program is loaded at other than the address at which it was stored; and (e) two temporarily-writable sections used for indirection and inter-module linking.

14. A method according to claim 13 wherein the indirection sections are writable at load time and read-only afterward.

15. A method according to claim 13 wherein the inter-module linking sections are kept read-only but made writable each time an exit from the cache data file is linked to a new block of native code.

16. A method according to claim 13 wherein the code cache layout further comprises internal links within and amongst the temporarily-writable sections.

17. A method according to claim 16 wherein the code cache layout further comprises external links which are isolated to the two temporarily-writable sections.

18. A method according to claim 13 wherein the header of the code cache indicates if any instrumentation is present in the code cache file.

19. A method according to claim 18 wherein the header of the code cache identifies the instrumentation tool and version.

20. A method according to claim 19 wherein the layout comprises a namespace that includes the tool identifier to support multiple simultaneous code caches for the same module but with different instrumentation.

21. A method according to claim 20 wherein the tool identifier in the code cache provides relocation information when the tool did not use position-independent instrumentation code.

22. A method according to claim 1 wherein (c) comprises: (1) retrieving native code corresponding to the stored runtime data comprising the profile information in a cache data file; and (2) building the code cache file from the retrieved native code.

23. A method according to claim 1 wherein (b) comprises storing runtime data comprising a list of starting basic block addresses of the received native code.

24. A method according to claim 1 wherein (b) comprises storing the runtime data in a location that is selected in relation to the security privilege level of the user running the application program.

25. A method according to claim 1 wherein (c) comprises determining if a code cache file corresponding to the native code already exists, and if so, merging the code cache file converted from the runtime data received in (b) with the existing code cache file.

26. A method according to claim 1 wherein (c) includes storing a checksum of the module of the application program in the code cache file, and wherein the use of the code cache file as a runtime code cache in (d) includes comparing the stored checksum with a checksum of a current version of the corresponding native code of the module of the application program to check the consistency of the runtime code cache.

27. A method according to claim 1 wherein (c) includes storing a checksum of the code cache file, and wherein the use of the code cache file as a runtime code cache in (d) includes computing the checksum of the code cache file and comparing the computed checksum with the stored checksum to check for corruption of the code cache file.

28. A method according to claim 1 wherein validating the cache data file occurs before converting the cache data file into a code cache file.

29. A method according to claim 1 wherein (c) comprises converting pointers to absolute addresses to relocatable addresses.

30. A method according to claim 1 comprising the initial step of defining a trusted computing base comprising one or more trusted users and a non-trusted computing base comprising one or more non-trusted users, and wherein (d) comprises: (i) storing a code cache file converted from runtime data received from a trusted user in a protected directory that is shareable by all users; and (ii) storing a code cache file converted from runtime data received from a non-trusted user in a separate directory that is isolated and accessible only by the particular non-trusted user who generated the runtime data.

31. A method according to claim 30 wherein each protected directory is writable only by a trusted user.

32. A method according to claim 30 wherein (b) and (c) are performed by a non-trusted user to generate a code cache file, and wherein in (d) a trusted user receives the code cache file generated by the non-trusted user, verifies the code cache, and enables the code cache file to be pre-loaded as a runtime code cache.

33. A method according to claim 32 wherein the code cache file is enabled to be pre-loaded as a runtime code cache with only an inherited file handle.

34. A method according to claim 1 wherein (d) comprises validating the runtime data in each code cache file against runtime data corresponding to a current version of the native code of the application program.

35. A method according to claim 1 comprising performing (c) or (d) in a static mode.

36. An apparatus for caching computer code from an application program comprising a plurality of modules that each comprise a separately loadable file, the apparatus comprising:
   (a) a processor;
   (b) a non-volatile memory;
   (c) a volatile memory;
   (d) a shared code caching engine comprising code instruction sets for:
      (1) receiving native code comprising at least a portion of a module of the application program;
      (2) storing runtime data corresponding to the native code in a cache data file in the non-volatile memory, wherein the runtime data comprises profile information separate from the native code;
      (2') validating the cache data file with the native code based on the stored runtime data;
      (3) converting the cache data file into a code cache file, wherein the converting comprises using the profile information to write the native code into the code cache file;
      (4) enabling the code cache file to be pre-loaded as a runtime code cache; and
      (5) repeating (1) through (4), to store a plurality of separate cache data files at different locations in non-volatile memory.

37. An apparatus according to claim 36 wherein the shared code cache engine comprises code instruction sets for incrementally building the runtime data from a plurality of blocks of executed native code received over time, and when a trigger point is reached, freezing and storing the runtime data corresponding to the received blocks of code in a cache data file.

38. An apparatus according to claim 37 comprising code instruction sets for freezing the runtime data when a trigger point comprising a target data size is reached.

39. An apparatus according to claim 37 comprising code instruction sets for freezing the runtime data when a trigger point comprising a module unload or process exit event occurs.

40. An apparatus according to claim 37 comprising code instruction sets for copying a successor block of native code of a block of native code that is frozen, to the slot immediately after the frozen block of native code, to elide the jump instruction linking the two blocks of native code.

41. An apparatus according to claim 37 comprising code instruction sets for replacing one or more exit stub trampolines that link two blocks of native code with a direct jump instruction.

42. An apparatus according to claim 41 comprising an incoming link data structure to store and track incoming transfer instructions to the code cache entry point of a successor block of native code to enable unlinking if the successor block or its predecessor block of native code is unloaded or invalidated.

43. An apparatus according to claim 37 comprising code instruction sets for storing exit stub trampolines from a frozen cache whose successor blocks of native code are not present, in a separate location in the cache data file.

44. An apparatus according to claim 43 comprising code instruction sets for making a read-only exit stub trampoline from a block of native code temporarily writable each time an exit from the code cache is linked to a new block of native code.

45. An apparatus according to claim 37 comprising code instruction sets for routing a target of an exit stub trampoline that exits the code cache file through special jump trampolines located adjacent to the frozen code cache.

46. An apparatus according to claim 37 comprising code instruction sets for routing an exit stub trampoline from a block of native code that ends in an indirect branch through special jump trampolines located in a separate location in the cache data file.

47. An apparatus according to claim 36 wherein the shared code cache engine comprises code instruction sets for storing a cache data file or code cache file with the following layout: (a) a header containing version information for (i) the native code of the module of the application program which is stored as runtime data in the cache data file, (ii) the runtime system that produced the code cache, and (iii) a section directory; (b) at least one of a checksum of native code or a checksum of the cache data file; (c) a hash table of entry points which identify the blocks of native code present in the code cache file; (d) relocation data which is used when the native code of the module of the application program is loaded at other than the address at which it was stored; (e) two temporarily-writable sections used for indirection and inter-module linking.

48. An apparatus according to claim 47 comprising code instruction sets for writing the indirection sections once at load time and maintaining them read-only afterward.

49. An apparatus according to claim 47 comprising code instruction sets for keeping the inter-module linking sections read-only and making them writable each time an exit from the cache data file is linked to a new block of data.

50. An apparatus according to claim 47 comprising code instruction sets for storing internal links within and among the temporarily-writable sections in the code cache layout.

51. An apparatus according to claim 50 comprising code instruction sets for storing external links which are isolated to the two temporarily-writable sections in the code cache layout.

52. An apparatus according to claim 47 comprising code instruction sets for indicating in the header if any instrumentation is present in the code cache file.

53. An apparatus according to claim 52 comprising code instruction sets for identifying the instrumentation tool and version in the header of the code cache layout.

54. An apparatus according to claim 53 comprising code instruction sets for providing a namespace that includes the tool identifier to support multiple simultaneous code caches for the same module but with different instrumentation, in the header of the code cache layout.

55. An apparatus according to claim 54 comprising code instruction sets for providing relocation information in the tool identifier of the code cache when the tool does not use position-independent instrumentation code.

56. An apparatus according to claim 37 comprising code instruction sets for: (1) retrieving native code corresponding to the stored runtime data comprising the profile information in the cache data files; and (2) building the code cache file from the retrieved native code.

57. An apparatus according to claim 36 comprising code instruction sets for storing runtime data comprising a list of starting basic block addresses of the received native code.

58. An apparatus according to claim 36 comprising code instruction sets for storing the runtime data in a location that is selected in relation to the security privilege level of the user running the application program.

59. An apparatus according to claim 36 comprising code instruction sets for determining if a code cache file corresponding to the native code already exists, and if so, merging the code cache file converted from the runtime data received in (b) with the existing code cache file.

60. An apparatus according to claim 36 comprising code instruction sets for storing a checksum of the module of the application program in the code cache file, and comparing the stored checksum with a checksum of a current version of the corresponding native code of the module of the application program to check the consistency of the runtime code cache.

61. An apparatus according to claim 36 comprising code instruction sets for storing a checksum of the code cache file, and computing the checksum of the code cache file and comparing the computed checksum with the stored checksum to check for corruption of the code cache file.

62. An apparatus according to claim 36 wherein validating the cache data file occurs before converting the cache data file into a code cache file.

63. An apparatus according to claim 36 comprising code instruction sets for converting pointers to absolute addresses to relocatable addresses.

64. An apparatus according to claim 36 comprising code instruction sets for defining a trusted computing base comprising one or more trusted users and a non-trusted computing base comprising one or more non-trusted users, and for: (i) storing a code cache file converted from runtime data received from a trusted user in a protected directory that is shareable by all users; and (ii) storing a code cache file converted from runtime data received from a non-trusted user in a separate directory that is isolated and accessible only by the particular non-trusted user who generated the runtime data.

65. An apparatus according to claim 64 comprising code instruction sets for allowing each protected directory to be writable only by a trusted user.

66. An apparatus according to claim 64 comprising code instruction sets for allowing a non-trusted user to generate a code cache file, and allowing a trusted user to receive the code cache file generated by the non-trusted user, verify the code cache, and enable the code cache file to be pre-loaded as a runtime code cache.

67. An apparatus according to claim 66 comprising code instruction sets for enabling the code cache file to be pre-loaded as a runtime code cache with only an inherited file handle.

68. An apparatus according to claim 36 comprising code instruction sets for validating the runtime data in each code cache file against runtime data corresponding to a current version of the native code of the application program.

69. An apparatus according to claim 36 comprising code instruction sets for repeating (1) through (4), to store a plurality of separate cache data files at different locations in non-volatile memory, in a static mode.

70. A method according to claim 1 wherein the code cache file includes at least one read-only section that can be switched to a writable section when a link to a target outside the code cache file is called at runtime and switched back to a read-only section after performing the link.

71. An apparatus according to claim 36 wherein the code cache file includes at least one read-only section that can be switched to a writable section when a link to a target outside the code cache file is called at runtime and switched back to a read-only section after performing the link.

\* \* \* \* \*